(12) United States Patent
Cao et al.

(10) Patent No.: US 12,206,497 B2
(45) Date of Patent: Jan. 21, 2025

(54) METHODS AND APPARATUSES FOR BROADCAST MULTICAST OR GROUPCAST TRANSMISSION USING VERTICAL CHECK BLOCKS

(71) Applicants: Yu Cao, Ottawa (CA); Ming Jia, Ottawa (CA); Jianglei Ma, Ottawa (CA)

(72) Inventors: Yu Cao, Ottawa (CA); Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 17/368,500

(22) Filed: Jul. 6, 2021

(65) Prior Publication Data

US 2022/0021483 A1    Jan. 20, 2022

Related U.S. Application Data

(60) Provisional application No. 63/053,337, filed on Jul. 17, 2020.

(51) Int. Cl.
*H04L 1/00* (2006.01)
*H04L 1/06* (2006.01)
(Continued)

(52) U.S. Cl.
CPC .......... *H04L 1/0643* (2013.01); *H04L 1/1819* (2013.01); *H04L 1/189* (2013.01); *H04L 1/1896* (2013.01); *H04W 72/02* (2013.01)

(58) Field of Classification Search
CPC ..... H04L 1/0643; H04L 1/1819; H04L 1/189; H04L 1/1896; H04L 1/1887;
(Continued)

(56) References Cited

U.S. PATENT DOCUMENTS 10,388,400 B2 *   8/2019  Kumar ............... G06F 11/1088
2012/0060071 A1 *  3/2012  Shin .................. H03M 13/2927
                                                    714/755
(Continued)

FOREIGN PATENT DOCUMENTS

CN    109150466 A    1/2019
CN    110140311 A    8/2019
(Continued)

OTHER PUBLICATIONS

"Consideration on Outer Codes for NR", 3GPP TSG-RAN WG1 #86bis, Lisbon, Portugal, Oct. 10-14, 2016.
(Continued)

*Primary Examiner* — Brandon M Renner

(57) ABSTRACT

Methods and systems for two-dimensional (2D) coding are described for broadcast, multicast or groupcast applications. Two or more information code blocks (CBs) are transmitted to a plurality of intended receiving nodes. One or more cross-CB check blocks are generated, each cross-CB check block being generated based on a set of cross-CB bits, the set of cross-CB bits including at least one bit selected from each of at least two of the information CBs. At least one cross-CB check block is transmitted to at least one of the intended receiving nodes.

20 Claims, 25 Drawing Sheets

(51) Int. Cl.
*H04L 1/1812* (2023.01)
*H04L 1/1867* (2023.01)
*H04W 72/02* (2009.01)

(58) Field of Classification Search
CPC ............... H04L 1/0041; H04L 1/0057; H04L 2001/0093; H04W 72/02
See application file for complete search history.

(56) References Cited

U.S. PATENT DOCUMENTS

| | | |
|---|---|---|
| 2018/0159660 A1* | 6/2018 | Jia .................. H03M 13/271 |
| 2019/0165882 A1* | 5/2019 | You .................. H04W 72/0446 |
| 2020/0235759 A1* | 7/2020 | Ye .................. H03M 13/6306 |
| 2021/0126655 A1 | 4/2021 | Jia et al. |
| 2021/0226732 A1* | 7/2021 | Yeo .................. H03M 13/6356 |
| 2021/0297180 A1 | 9/2021 | Ma et al. |
| 2022/0158760 A1* | 5/2022 | Hwang ................ H04L 1/0057 |

FOREIGN PATENT DOCUMENTS

| | | |
|---|---|---|
| CN | 115804031 A | 3/2023 |
| EP | 3783824 A1 | 2/2021 |
| JP | 2002330118 A | 11/2002 |
| JP | 2016504866 A | 2/2016 |
| JP | 2018056813 A | 4/2018 |
| JP | 2019506055 A | 2/2019 |
| JP | 2020507995 A | 3/2020 |
| TW | 201841485 A | 11/2018 |
| WO | 2018099358 A1 | 6/2018 |
| WO | 2019221499 A1 | 11/2019 |
| WO | 2020067782 A1 | 4/2020 |
| WO | 2021083210 A1 | 5/2021 |

OTHER PUBLICATIONS

"Erasure Coding and HARQ Design", 3GPP TSG-RAN WG1 #86bis, Lisbon, Portugal, Oct. 10-14, 2016.

* cited by examiner

METHODS AND APPARATUSES FOR BROADCAST MULTICAST OR GROUPCAST TRANSMISSION USING VERTICAL CHECK BLOCKS

CROSS-REFERENCE TO RELATED APPLICATIONS

The present disclosure claims priority to U.S. provisional patent application No. 63/053,337, filed Jul. 17, 2020, entitled "METHODS AND APPARATUSES FOR BROADCAST MULTICAST OR GROUPCAST TRANSMISSION USING VERTICAL CHECK BLOCKS", the entirety of which is hereby incorporated by reference.

FIELD

The present disclosure relates to wireless communications, including the use of product coding in broadcast, multicast or groupcast wireless communications.

BACKGROUND

In typical cellular communications, unicast transmission is a common scenario. By "unicast", it is meant that a single transmitting node transmits to a single receiving node. Increasingly, broadcast and multicast transmissions are being used in cellular systems, such as in Multimedia Broadcast Multicast Services (MBMS). By "broadcast", it is meant that a single transmitting node transmits to all nodes connected to the transmitting node. By "multicast", it is meant that a single transmitting node transmits to multiple intended receiving nodes. Applications continue to be developed for broadcast and multicast communications, especially for multimedia services and vehicle to everything (V2X) communications.

V2X refers to a category of communication scenarios involving a vehicle (acting as a user equipment (UE)), including communication between a vehicle and another vehicle (V2V), vehicle to infrastructure (V2I), vehicle to pedestrian (V2P), and many other scenarios. Long term evolution-vehicle (LTE-V) is the standard for supporting V2X communications using Long term evolution (LTE) cellular technology. LTE-V is mainly focused on broadcasting messages, such as safety message. However, there is interest for other applications. For example, New Radio (NR)-V2X, which is based on NR cellular technology, supports broadcast, groupcast (which is a form of multicast between UEs) and unicast. Groupcast and unicast applications may support feedback-based retransmission, while broadcast may only support blind retransmission (i.e., retransmission/repetition without feedback). In broadcast, multicast or groupcast scenarios, each receiving node may have different error in the received data. Existing retransmission schemes may not be suitable or efficient for broadcast, multicast or groupcast scenarios.

SUMMARY

In various examples, the present disclosure describes methods and apparatuses for physical (PHY) layer network coding based on two-dimensional (2D) joint coding. The disclosed examples may be applicable for broadcast, multicast and groupcast transmissions, among other applications.

Retransmission schemes used in conventional broadcast, multicast, and groupcast transmission approaches suffer from inefficiency, latency, and overhead. These conventional retransmission schemes typically rely on retransmitting an entire transport block or code block groups in a highly redundant manner. Moreover, retransmission in the broadcast, multicast, and groupcast scenarios compounds the problem because different receivers may have different undecoded code blocks and these scenarios may require an entire transport block or multiple code block groups to be retransmitted. Erasure outer code based retransmission may suffer performance disadvantages when used in non-erasure channel as undecoded code blocks are discarded and no soft information is retained for joint decoding.

Embodiments of the present disclosure employing PHY layer network coding based on 2D joint coding solve or improve upon some or all of these deficiencies. Accordingly, the methods and apparatuses of the present disclosure can avoid the costly and inefficient retransmissions of the conventional approaches. In addition, the ability to utilize soft information from unsuccessful decoding attempts provides performance gain over erasure outer code based retransmission schemes. In examples described herein, a single vertical check block can be multicasted or broadcasted to different receivers and be used by the different receivers for decoding, even if the different receivers have different erroneous code blocks in the initial transmission.

In an example aspect, the present disclosure describes a method, including: transmitting two or more information code blocks (CBs) to a plurality of intended receiving nodes; generating one or more cross-CB check blocks, each cross-CB check block being generated based on a set of cross-CB bits, the set of cross-CB bits including at least one bit selected from each of at least two of the information CBs; and transmitting at least one of the one or more cross-CB check blocks to at least one of the intended receiving nodes.

In the preceding aspect of the method, the two or more information CBs may be transmitted in a broadcast, multicast or groupcast transmission to the plurality of intended receiving nodes, and the at least one cross-CB check block may be transmitted in a broadcast, multicast or groupcast transmission to two or more of the intended receiving nodes.

In any of the preceding aspects of the method, feedback from the intended receiving nodes may indicate whether a respective intended receiving node successfully decoded the two or more information CBs. The method may further include: transmitting the at least one cross-CB check block after determining, from received negative acknowledgement (NACK) feedback or absence of acknowledgement (ACK) feedback, that at least one of the intended receiving nodes failed to successfully decode the two or more information CBs.

In any of the preceding aspects of the method, respective sets of one or more cross-CB check blocks may be transmitted in respective retransmissions, for a predetermined number of retransmissions, without requiring any feedback from any of the intended receiving nodes for an initial transmission.

In any of the preceding aspects of the method, the method may further include: receiving an acknowledgement (ACK) feedback from at least one intended receiving node, after the initial transmission or after a given retransmission. Any retransmissions after the initial transmission or the given retransmission may not be transmitted to the at least one intended receiving node from which the ACK feedback was received.

In any of the preceding aspects of the method, transmission of at least one of the one or more cross-CB check blocks to the plurality of intended receiving nodes may be repeated, in absence of negative acknowledgement (NACK) feedback, until an acknowledgement (ACK) feedback is received from each of the plurality of intended receiving nodes.

In any of the preceding aspects of the method, the two or more information CBs may be transmitted in at least two separately transmitted packets to the plurality of intended receiving nodes, and the one or more cross-CB check blocks may be generated based on bits selected from CBs of each of the at least two packets.

In any of the preceding aspects of the method, the method may further include: transmitting a configuration or control signal to the intended receiving nodes, the configuration signal including information about one or more parameters used in generating the one or more cross-CB check blocks. The configuration or control signal may include information about one or more of: an indication of new transmission or retransmission; a HARQ process identifier; a number of repetitions for retransmission; a number of cross-CB check blocks transmitted; an index of the two or more information CBs used for generating the one or more cross-CB check blocks; an interleaver used for generating the one or more cross-CB check blocks; or a redundancy version (RV) or RV sequence indicating how the one or more cross-CB check blocks are generated.

In any of the preceding aspects of the method, the method may further include: receiving, from a base station, a scheduled resource allocation for transmitting the two or more information CBs. Resources for transmission of the at least one cross-CB check block may be also allocated by the base station.

In the preceding aspect of the method, the method may further include: receiving feedback indicating whether at least one intended receiving node failed to successfully decode at least one of the two or more information CBs; transmitting, to the base station, a report of negative acknowledgement (NACK); and receiving, from the base station, additional scheduled resource allocation for transmitting the at least one cross-CB check block.

In any of the preceding aspects of the method, resources for a predetermined number of transmissions of cross-CB check blocks may be also allocated in the scheduled resource allocation from the base station.

In any of the preceding aspects of the method, the method may further include: selecting, from a resource pool, resources for transmitting the two or more information CBs. Resources for transmission of the at least one cross-CB check block may be also selected from the resource pool.

In an example aspect, the present disclosure describes an apparatus including a processing unit. The processing unit is configured to execute machine-readable instructions to cause the apparatus to: transmit two or more information code blocks (CBs) to a plurality of intended receiving nodes; generate one or more cross-CB check blocks, each cross-CB check block being generated based on a set of cross-CB bits, the set of cross-CB bits including at least one bit selected from each of at least two of the information CBs; and transmit at least one of the one or more cross-CB check blocks to at least one of the intended receiving nodes.

In the preceding aspect of the apparatus, the two or more information CBs may be transmitted in a broadcast, multicast or groupcast transmission to the plurality of intended receiving nodes, and the at least one cross-CB check block may be transmitted in a broadcast, multicast or groupcast transmission to two or more of the intended receiving nodes.

In any of the preceding aspects of the apparatus, feedback from the intended receiving nodes may indicate whether a respective intended receiving node successfully decoded the two or more information CBs. The processing unit may be further configured to execute the instructions to cause the apparatus to: transmit the at least one cross-CB check block after determining, from received negative acknowledgement (NACK) feedback or absence of acknowledgement (ACK) feedback, that at least one of the intended receiving nodes failed to successfully decode the two or more information CBs.

In any of the preceding aspects of the apparatus, respective sets of one or more cross-CB check blocks may be transmitted in respective retransmissions, for a predetermined number of retransmissions, without requiring any feedback from any of the intended receiving nodes for an initial transmission.

In any of the preceding aspects of the apparatus, the processing unit may be further configured to execute the instructions to cause the apparatus to: transmit a configuration or control signal to the intended receiving nodes, the configuration signal including information about one or more parameters used in generating the one or more cross-CB check blocks. The configuration or control signal may include information about one or more of: an indication of new transmission or retransmission; a HARQ process identifier; a number of repetitions for retransmission; a number of cross-CB check blocks transmitted; an index of the two or more information CBs used for generating the one or more cross-CB check blocks; an interleaver used for generating the one or more cross-CB check blocks; or a redundancy version (RV) or RV sequence indicating how the one or more cross-CB check blocks are generated.

In any of the preceding aspects of the apparatus, the processing unit may be further configured to execute the instructions to cause the apparatus to: receive, from a base station, a scheduled resource allocation for transmitting the two or more information CBs. Resources for transmission of the at least one cross-CB check block may be also allocated by the base station.

In any of the preceding aspects of the apparatus, the processing unit may be further configured to execute the instructions to cause the apparatus to: select, from a resource pool, resources for transmitting the two or more information CBs. Resources for transmission of the at least one cross-CB check block may be also selected from the resource pool.

In any of the preceding aspects of the apparatus, the processing unit may be configured to execute machine-readable instructions to cause the apparatus to perform any of the aspects of the method described above.

In an examples aspect, the present disclosure describes a computer readable medium having machine-executable instructions stored thereon. The instructions, when executed by a processing unit of an apparatus, cause the apparatus to: transmit two or more information code blocks (CBs) to a plurality of intended receiving nodes; generate one or more cross-CB check blocks, each cross-CB check block being generated based on a set of cross-CB bits, the set of cross-CB bits including at least one bit selected from each of at least two of the information CBs; and transmit at least one of the one or more cross-CB check blocks to at least one of the intended receiving nodes.

In any aspect of the computer readable medium, the instructions, when executed by a processing unit of an apparatus, may cause the apparatus to perform the any of the aspects of the method described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
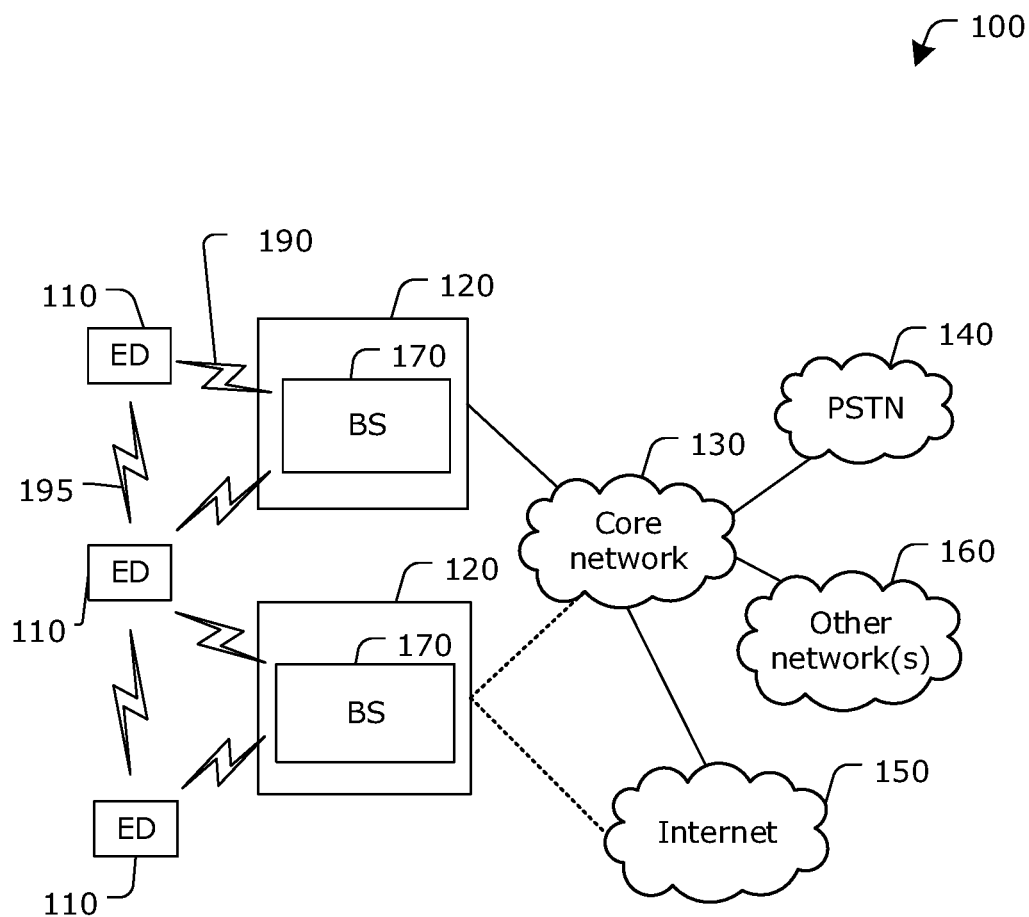
FIG. 1 is a schematic diagram of an example communication system suitable for implementing examples described herein.

In various examples described herein, methods and apparatuses for implementing HARQ-based retransmission or network coding are described. The examples described herein may help to address challenges in retransmission for broadcast, multicast or groupcast transmissions. For example, broadcast, multicast or groupcast transmissions, each receiving node may have reception error in different code blocks, and the transmission channel is usually not an erasure channel.

To help understand the present disclosure, some existing approaches for retransmission are now described.

Hybrid automatic repeat request (H-ARQ or HARQ) is a common feature of wireless physical-layer retransmission. The typical HARQ implementation includes using incremental redundancy (IR) based retransmission, which transmits additional bits of an untransmitted mother-code when an initial transmission fails. In other words, a mother-code is stored in a circular buffer, and after an initial code block containing bits from the mother-code is transmitted, as part of the HARQ process, the transmitter transmits new IR bits from the circular buffer. The new IR bits together with the previously transmitted data form a new code block. This is repeated until a maximum number of retransmissions is reached or a code block is successfully decoded.

HARQ retransmission schemes include feedback-based retransmission schemes and blind retransmission schemes. In feedback-based retransmission, receiving nodes much send acknowledgement (ACK) or negative acknowledgement (NACK) back to the transmitting node. A retransmission is sent if a NACK is received. In blind retransmission, ACK/NACK response from the receiving nodes is optional. The transmitting node instead sends a predetermined number of retransmissions. For groupcast SL transmissions, there may be different options for receiving nodes to send ACK/NACK. In one option, receiving nodes only send NACK (no ACK is sent for successful reception). All receiving nodes share the same physical sidelink feedback channel (PSFCH) resource, with the result that the transmitting node may not know which receiving node sent which NACK. In another option, each receiving node has its own dedicated PSFCH resource for sending ACK/NACK feedback.

Various retransmission schemes based on forward error correction (FEC) have been considered for broadcast or multicast transmissions. A few of these existing approaches are now described.

Fountain code is a type of rateless code. Fountain codes are suitable for broadcast or multicast transmissions without feedback. Conventional Multimedia Broadcast Multimedia Services (MBMS) systems use raptor code, which is an implementation of fountain code, for FEC in the application layer without HARQ retransmission or HARQ feedback. However, fountain code is designed for higher layer feedback, not for lower levels of a protocol stack (e.g., transport block or code block level on the physical (PHY) layer). Compared to solutions that use PHY layer retransmission, fountain code has longer delays in retransmissions and is not suitable for low latency applications. Further, fountain code is an erasure code, and thus has impaired performance for transmissions in a non-erasure channel.

Another existing approach is erasure outer code. In erasure outer code, a parity code block is generated based on multiple code blocks for HARQ retransmission. The parity code block can be used to correct different erased information code blocks. However, performance is impaired for transmissions over a non-erasure channel, because undecoded code blocks are entirely discarded. This means that each parity code block can correct for only one undecoded code block.

To assist in understanding the present disclosure, an example wireless communication system is first described.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology. In some examples, the wireless system 100 may also accommodate some legacy wireless technology (e.g., 3G or 4G wireless technology).

In the example shown, the wireless system 100 includes electronic devices (EDs) 110, radio access networks (RANs) 120, a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment (UE), a wireless transmit/receive unit (WTRU), a mobile station, a mobile relay, a fixed or mobile subscriber unit, a cellular telephone, a station (STA), a machine type communication (MTC) device, a personal digital assistant (PDA), a smartphone, a laptop, a computer, a tablet, a wireless sensor, an internet of things (IoT) device, a network-enabled vehicle, or a consumer electronics device, among other possibilities. Future generation EDs 110 may be referred to using other terms.

In FIG. 1, the RANs 120 include base stations (BSs) 170. Although FIG. 1 shows each RAN 120 including a single respective BS 170, it should be understood that any given RAN 120 may include more than one BS 170, and any given RAN 120 may also include base station controller(s) (BSC), radio network controller(s) (RNC), relay nodes, elements, and/or devices. Each BS 170 is configured to wirelessly interface with one or more of the EDs 110 to enable access to any other BS 170, the core network 130, the PSTN 140, the internet 150, and/or the other networks 160. For example, the BSs 170 may also be referred to as (or include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. In some examples, a BS 170 may access the core network 130 via the internet 150.

The EDs 110 and BSs 170 are examples of communication equipment that can be used to implement some or all of the functionality and/or embodiments described herein. Any BS 170 may be a single element, as shown, or multiple elements, distributed in the corresponding RAN 120, or otherwise. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more uplink (UL)/downlink (DL) wireless interfaces 190 (e.g., via radio frequency (RF), microwave, infrared (IR), etc.). The UL/DL interface 190 may also be referred to as a UL/DL connection, ED-BS link/connection/interface, or ED-network link/connection/interface, for example. The EDs 110 may also communicate directly with one another (i.e., without involving the BS 170) via one or more sidelink (SL) wireless interfaces 195. The SL interface 195 may also be referred to as a SL connection, UE-to-UE link/connection/interface, vehicle-to-vehicle (V2V) link/connection/interface, vehicle-to-everything (V2X) link/connection/interface, vehicle-to-infrastructure (V2I) link/connection/interface, vehicle-to-pedestrian (V2P) link/connection/interface, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). The internet 150 may include a network of computers and subnets (intranets) or both, and incorporate protocols, such as Internet Protocol (IP), Transmission Control Protocol (TCP), User Datagram Protocol (UDP). The EDs 110 may be multimode devices capable of operation according to multiple radio access technologies, and incorporate multiple transceivers necessary to support such.

Figure 2:
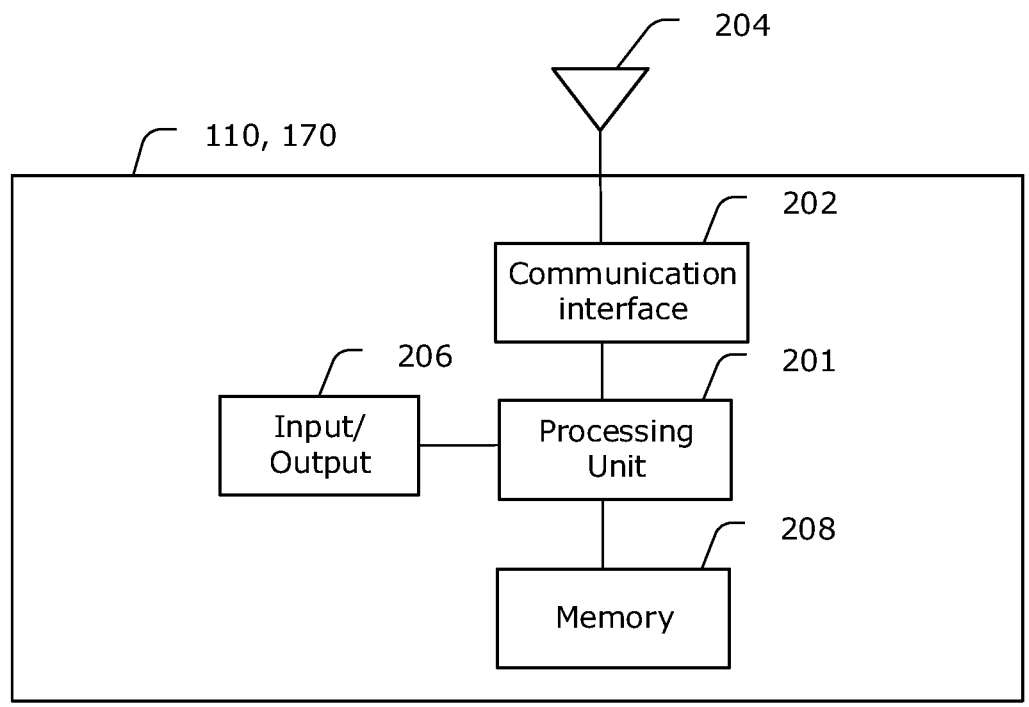
FIGS. 2 and 3 are block diagrams showing an example base station (BS) and an example electronic device (ED), respectively, suitable for implementing examples described herein.
Figure 3:
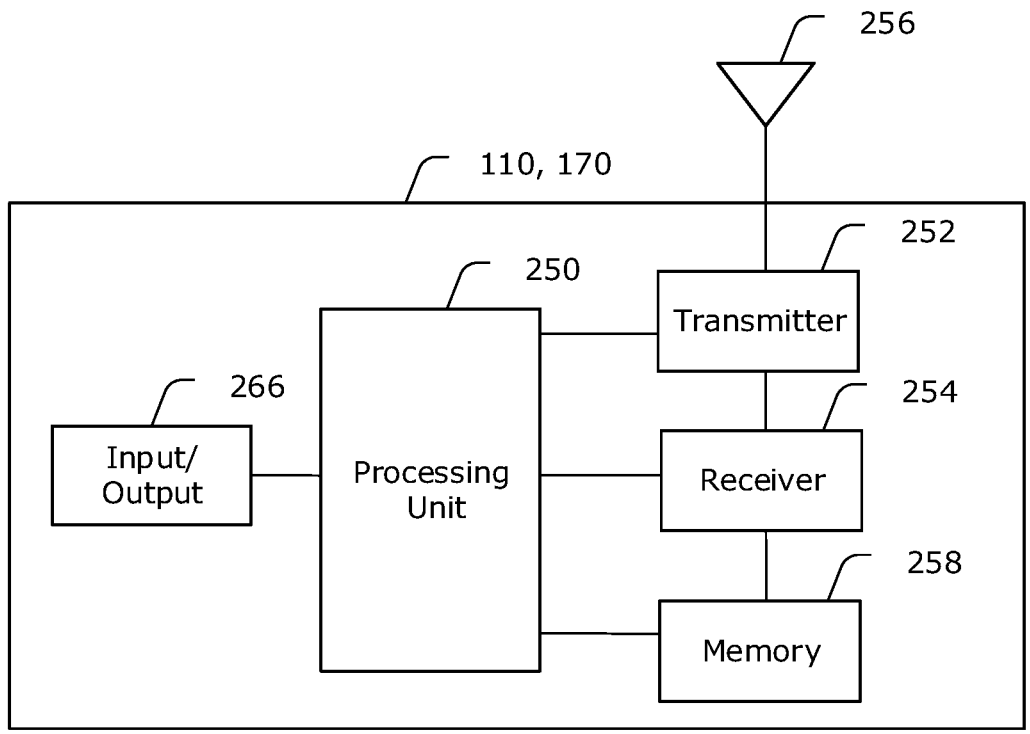

FIGS. 2 and 3 illustrate example apparatuses that may implement the methods and teachings according to this disclosure. FIGS. 2 and 3 illustrate different possible embodiments for the ED 110 and BS 170, and are not intended to be limiting.

As shown in FIG. 2, an example apparatus (e.g., an example embodiment of the ED 110 or BS 170) includes at least one processing unit 201. The processing unit 201 implements various processing operations of the apparatus. For example, the processing unit 201 could perform signal coding, data processing, power control, input/output processing, or any other functionality of the apparatus. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The apparatus (e.g., the ED 110 or BS 170) includes at least one communication interface 202 for wired and/or wireless communications. Each communication interface 202 includes any suitable structure for generating signals for wireless or wired transmission and/or processing signals received wirelessly or by wire. The apparatus in this example includes at least one antenna 204 (in other examples, the antenna 204 may be omitted). Each antenna 204 includes any suitable structure for transmitting and/or receiving wireless or wired signals. One or multiple communication interfaces 202 could be used in the apparatus. One or multiple antennas 204 could be used in the apparatus. In some examples, one or more antennas 204 may be an antenna array 204, which may be used to perform beamforming and beam steering operations. Although shown as a single functional unit, the apparatus could also be implemented using at least one transmitter interface and at least one separate receiver interface.

The apparatus (e.g., the ED 110 or BS 170) further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the apparatus (e.g., the ED 110 or BS 170) includes at least one memory 208. The memory 208 stores instructions and data used, generated, or collected by the apparatus. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, another example apparatus (e.g., another example embodiment of the ED 110 or BS 170) includes at least one processing unit 250, at least one transmitter 252, at least one receiver 254, one or more antennas 256, at least one memory 258, and one or more input/output devices or interfaces 266. The processing unit 250 implements various processing operations of the apparatus, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the apparatus. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Techniques for joint encoding of multiple code blocks (CBs) in a single transport block (TB), including the generation of vertical check blocks, have been described in U.S. patent application Ser. No. 16/665,121, entitled "SYSTEM AND METHOD FOR HYBRID-ARQ", filed Oct. 28, 2019, the entirety of which is hereby incorporated by reference.

Figure 4A:
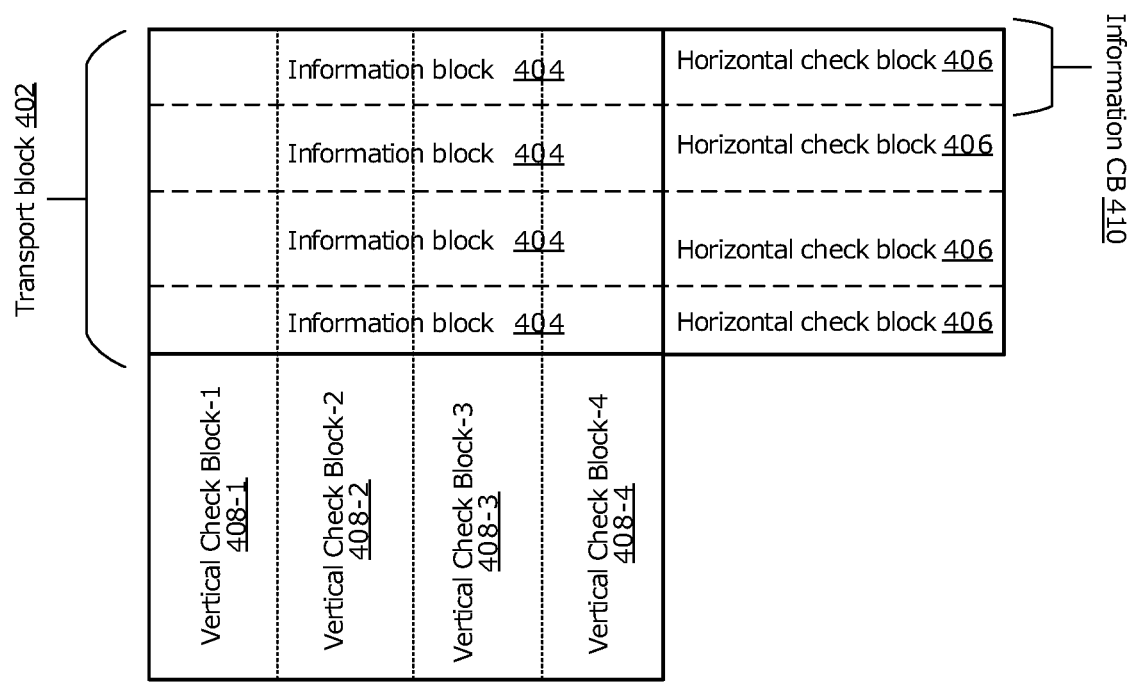
FIGS. 4A and 4B illustrate example code structures for a single transport block (TB), including horizontal check blocks and vertical check blocks.

FIG. 4A illustrates an example code structure for a single TB, including horizontal check blocks and vertical check blocks. The TB 402 includes multiple information blocks 404 formed from encoder input bits (in this example, four information blocks 404 are shown for simplicity, however this is not intended to be limiting). The encoder input bits may also be referred to as information bits. The bits in this example are arranged in L rows and K columns. The code structure also includes horizontal check blocks 406 (in this example, one horizontal check block 406 for each information block 404), and vertical check blocks 1-4 408-1 to 408-4 (generally referred to as vertical check block(s) 408). In this example, four vertical check blocks 408 are shown for simplicity, however this is not intended to be limiting. The number of vertical check blocks 408 to be used may be based on configuration at the transmitter (e.g., the BS 170 for downlink DL transmissions, or the ED 110 for uplink UL transmissions or SL transmissions) and/or defined by a standard. Further, the number of vertical check blocks 408 may or may not be equal to the number of horizontal check blocks 406. Each row in the code contains $n_1$ bits, including $k_1$ encoder input bits (or information bits) (in one information block 404) and a respective horizontal check block 406 containing $n_1$-$k_1$ check bits. In the present disclosure, check bits may also be referred to as redundancy bits, or in some examples (e.g., in the case of systematic code) referred to as parity bits.

Each information block 404 and corresponding horizontal check block 406 may be viewed as an $n_1$ bit information CB 410, with the TB 402 having multiple information CBs 410. In the example of FIG. 4A, the information CBs 410 are systematic CBs in that they each include systematic bits (in the information block 404) and check bits (in the horizontal check block 406) determined from the systematic bits. In other examples (discussed further below), the information CBs 410 may be non-systematic.

Each vertical check block 408 is generated from $k_2$ encoder input bits (or information bits) selected across multiple information blocks 404 (also referred to as cross-information block bits, cross-CB bits, or simply cross-block bits). The $k_2$ cross-block bits include M encoder input bits from each of the L information CBs 410, where M≥1, such that $k_2$=M≥L. In other words, the $k_2$ cross-block bits include the bits from one of the K columns, and each column is M bits wide. In some examples, $k_2$ cross-block bits may include different numbers of information bits taken from each information CB 410. This may be expressed mathematically as: $k_2=M_1+\ldots+M_L$, where $M_i$ is the number of information bits taken from each of the L information CBs 410, $M_i>0$ and there is no requirement for $M_p=M_q$, when $p\neq q$.

In the present disclosure, reference is made to "horizontal" (as in horizontal check block 406) and to "vertical" (as in vertical check block 408). These terms are used for convenience in understanding the layout in some of the Figures, and to distinguish the two types of check blocks from each other. However, these terms are not meant to imply any physical structure. More generally, the descriptors "horizontal" and "vertical" may be equally replaced with "first" and "second", respectively. For example, the horizontal and vertical check blocks 406, 408 can simply be referred to as first and second check blocks. In particular, each second (or vertical) check block is generated from information bits selected from two or more of the information CBs 410. The horizontal CBs may also be referred to as information CBs. For ease of understanding, the present disclosure will use the terms "horizontal" and "vertical" instead of "first" and "second", however this is not intended to be limiting.

Figure 4B:
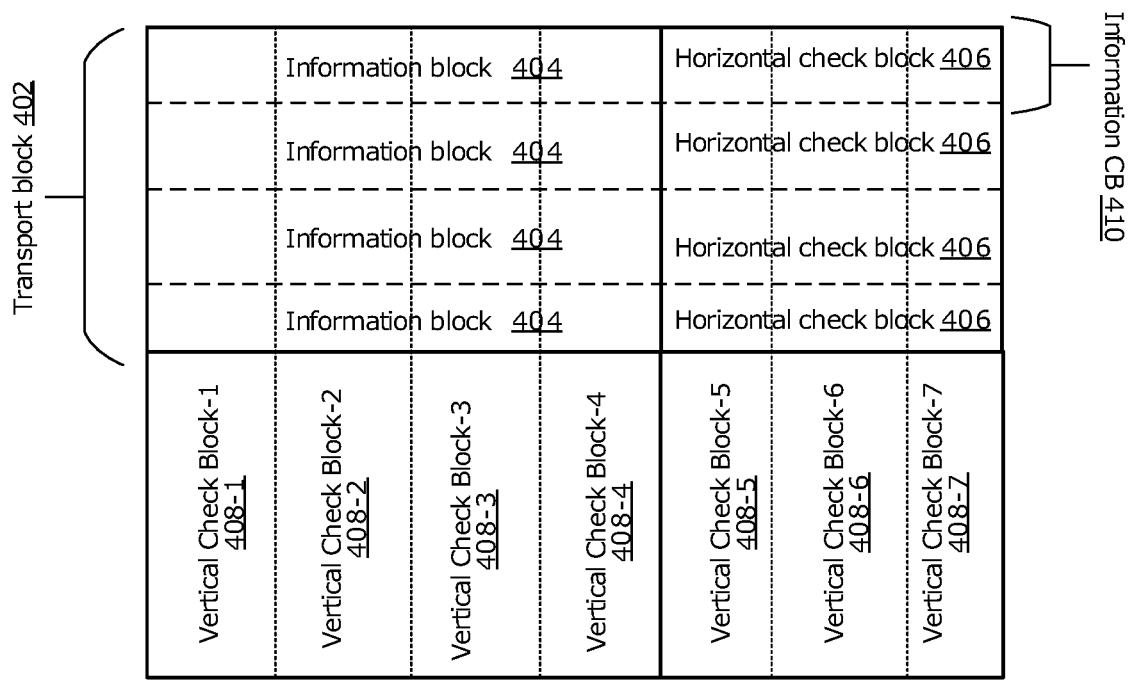

FIG. 4B illustrates another example code structure for a single TB, including horizontal check blocks and vertical check blocks. The example illustrated in FIG. 4B is similar to that of FIG. 4A, and features that are similar to the example of FIG. 4A need not be described again in detail. In the example of FIG. 4B, the code structure further includes vertical check blocks 5-7 408-5 to 408-7, in addition to the vertical check blocks 1-4 408-1 to 408-4 previously described (the vertical check blocks 1-7 480-1 to 408-7 may all be generally referred to as vertical check block(s) 408). The vertical check blocks 5-7 408-5 to 408-7 are similar to the vertical check blocks 1-4 408-1 to 408-4, with the difference that the vertical check blocks 5-7 408-5 to 408-7 are generated using bits selected from across multiple horizontal check blocks 406 (rather than bits selected from across multiple information blocks 404). In this way, the bits of the vertical check blocks 5-7 408-5 to 408-7 may be referred to as "check on check" bits.

FIGS. 4A and 4B show, and have been described with, bits being arranged in rows and columns; for example the vertical check block 408 is shown as having a rectangular/two dimensional structure. However, this is only for the purpose of illustration and is not intended to limit how the bits are arranged logically or in transmission. Further, the code structures shown in FIGS. 4A and 4B may be divided up for transmission (as discussed further below). Typically all the bits of one vertical check block 408 are transmitted in the same transmission.

The check bits contained in the horizontal check blocks 406 and vertical check blocks 408 are useful to assist decoding at a receiver. For example, after each decoding attempt at a decoder, where check bits are present, error checking can be performed to determine if the information bits in the information CB 410 have been successfully decoded. The vertical check block 408 contains check bits determined from across multiple information CBs 410, and thus provides information useful for decoding multiple information CBs 410. The decoder may use the check bits of the vertical check block 408 to assist in decoding of an information CB 410.

In transmission, the information CBs 410 (transmitted including the corresponding horizontal check blocks 406) may be transmitted in an initial transmission. As will be discussed further below, vertical check blocks 408 may also be transmitted together with the information CBs 410 in the initial transmission, or in a separate transmission (which may be referred to as a retransmission). Although retransmission can include just the non-systematic encoded bits from vertical check block(s) 408, retransmission can also include some systematic bits (i.e., information bits) related to the vertical check block(s) 408 in the retransmission.

In examples where the information CBs 410 are systematic (such as low density parity check (LDPC) code or Turbo code), an iterative decoding process may be used at the decoder (at the receiver) to decode the received CBs. The decoder calculates log-likelihood ratios (LLRs) of bit values during decoding of the information CBs, which may be considered a "soft" output of the decoder. In the present disclosure, soft output may refer to decoder output that is not yet finalized (e.g., bit value not yet definitively determined to be 1 or 0 value) but may provide information that can still be useful (e.g., in a subsequent decoding iteration). Such soft output may be probabilistic in nature (e.g., LLR). Information CBs 410 that are not correctly decoded (e.g., fails a check using the corresponding horizontal check blocks 406) may benefit from processing the vertical check blocks 408. Because each of the vertical check blocks 408 is generated from information bits selected from two or more (or all) of the information CBs 410, soft output from attempts to decode a vertical check block 408 (e.g., LLR) may help to improve decoding of the information CBs 410 (and vice versa). In at least this way, vertical check blocks 408 help to improve decoding.

Figure 5A:
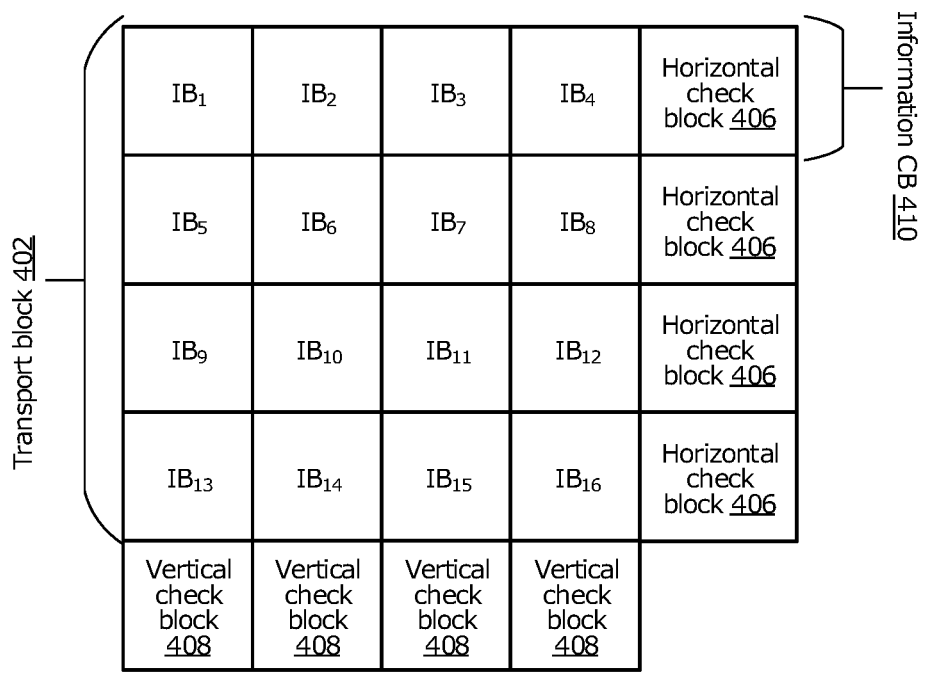
FIGS. 5A and 5B illustrate example uses of different interleavers for generating different sets of vertical check blocks.
Figure 5B:
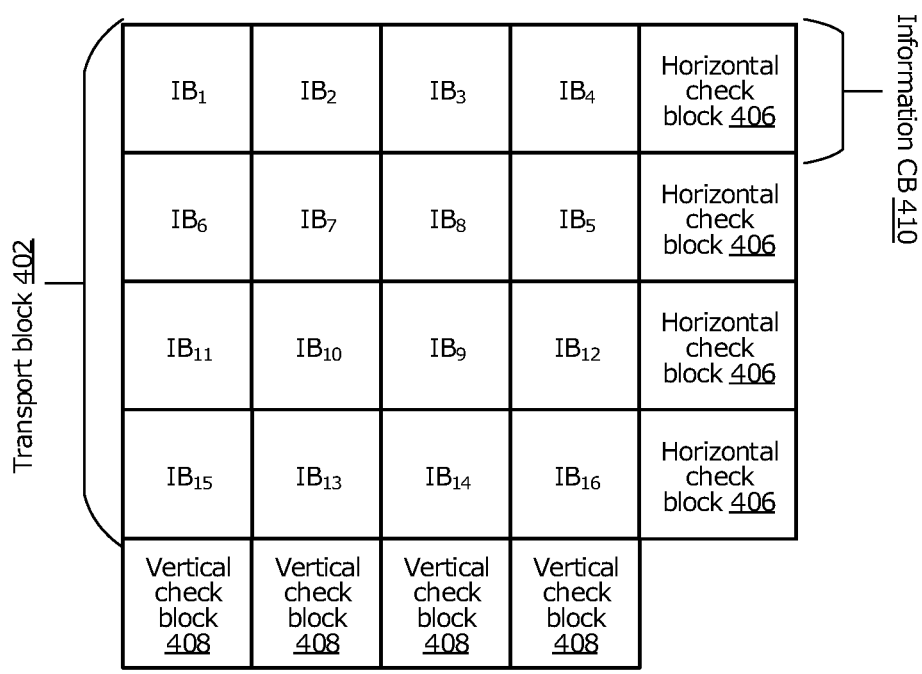

Reference is now made to FIGS. 5A and 5B. As mentioned above, vertical check blocks 408 are determined from cross-block bits selected from across the information CBs 410. For a given vertical check block 408, the cross-block bits may include information bits taken from different columns of different information CBs 410. For example, the cross-block bits may include input bits from column x of a first information CB 410, from column y of a second information CB 410, and from column z of a third information CB 410, where x, y and z are different. In another way of thinking, it may be considered that the cross-block bits for generating the vertical check blocks 408 may be selected by taking vertical columns of bits after the bits within an information row are optionally shuffled (also referred to as row-wise shuffling). This row-wise shuffling of the information bits may also be referred to as interleaving or row-wise interleaving. A predefined shuffling scheme or predefined interleaver may be used to perform this shuffling. The present disclosure describes the use of interleavers for such row-wise reordering of the information bits, for generating different vertical check blocks 408. An interleaver may be a predefined algorithm or predefined matrix (among other possibilities) that is applied to the row of bits to obtain a reordered row of bits. It should be understood that other techniques (not necessarily limited to interleaving) may be used.

FIG. 5A, for example, illustrates a TB 402 having four information CBs 410, where the information blocks 404 for each information CB 410 has been divided into four sub-blocks, for a total of 16 sub-blocks denoted as $IB_1$, $IB_2$, . . . ,$IB_{16}$. The consecutive indices of the sub-blocks illustrated in FIG. 5A represent the natural order (e.g., as outputted by the encoder) of the information bits in each information CB 410. In the example of FIG. 5A, no row-wise shuffling has been performed.

In contrast, consider the example of FIG. 5B. In this example, the information bits have been shuffled in at least one row (represented in FIG. 5B as shuffled indices of the sub-blocks) It can be seen that in the first row, the order of the sub-blocks is not changed, but in the second, third and fourth rows, the order is changed. Notably, the particular sub-blocks that belong to each information CB 410 are unchanged, only the order of the sub-blocks within each information CB 410. This means that the shuffling does not affect the horizontal check block 406 for each respective information CB 410. However, the vertical check blocks 408 in FIG. 5B will differ from the vertical check blocks 408 in FIG. 5A. The vertical check blocks 408 in FIG. 5A may be considered a first set of vertical check blocks 408, and the vertical check blocks 408 in FIG. 5B may be considered a second set of vertical check blocks 408.

Whether shuffling is used and how the encoder input bits are shuffled within each row may be configured at the transmitter (e.g., the BS 170 or the ED 110) and/or defined by a standard. It may be appreciated that shuffling the information bits using different interleavers will result in different sets of vertical check blocks 408 (e.g., the different first and second sets of vertical check blocks 408 in FIGS. 5A and 5B discussed above). In some examples, different sets of vertical check blocks 408 may be generated from the same TB 402, which may help to provide additional information for decoding purposes. For example, different sets of vertical check blocks 408 may be generated for different retransmission attempts.

Although FIGS. 4A, 4B, 5A and 5B illustrate code structure based on systematic code, this is illustrative only. The present disclosure is not limited to systematic code, and may be equally applicable and implemented with non-systematic code. Further, although the present disclosure describe examples that use vertical check blocks 408 in the context of multicast, groupcast and broadcast transmissions/retransmissions, it should be understood that the code structures illustrated in FIGS. 4A, 4B, 5A and 5B may also be suitable for unicast transmission/retransmissions, among others.

Figure 6:
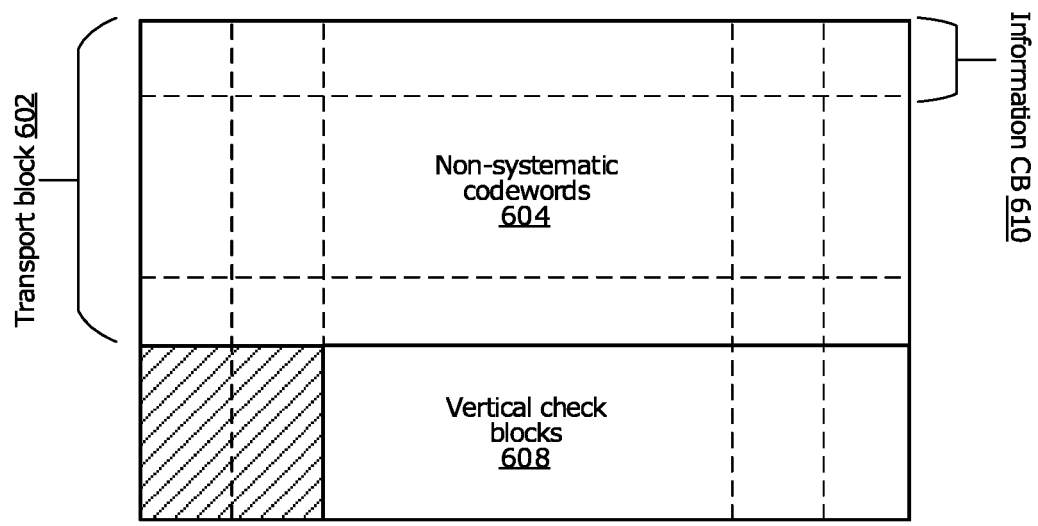
FIG. 6 illustrates an example code structure for a single TB based on non-systematic code, including vertical check blocks.

FIG. 6 illustrates an example code structure for a single TB based on non-systematic code (e.g., Polar code, block code, or convolutional code). Each non-systematic codeword is determined based on a set of encoder input bits, but the information bits do not appear in the codeword as systematic bits. Unlike systematic codes, horizontal check bits cannot be simply appended at the end of each row.

The TB 602 includes multiple non-systematic codewords 604. Each non-systematic codeword 604 may be viewed as an information CB 610. Unlike the examples of FIGS. 4A, 4B, 5A and 5B, the information CB 610 does not include a distinct horizontal check block. Each vertical check block 608 is generated by one or more columns of bits taken across multiple information CBs 610, similar to that described for FIGS. 4A and 4B.

It will be appreciated by persons skilled in the art that the following detailed discussion is not dependent on whether the vertical check blocks are generated from systematic or non-systematic CBs. For simplicity, the following may make reference to and use reference numbers referencing the examples of FIGS. 4A and 4B based on systematic CBs. It should be understood that this is not intended to be limiting.

In the present disclosure, the vertical check blocks may also be referred to as cross-block check blocks, because the bits for generating each vertical check block are taken across multiple information blocks. Similarly, the generation of the horizontal check blocks may be referred to as block-wise (or block-specific) coding, because the bits for generating each horizontal check block are taken from all the bits of a single information block. The generation of vertical check blocks may be referred to as two-dimensional (2D) coding, where 2D refers to the generation of vertical check blocks (in addition to horizontal check blocks in the case of systematic code). The terms "parity block" or "redundancy block" may also be used instead of "check block". For ease of understanding, the following discussion will refer to vertical check blocks and horizontal check blocks, however it should be understood that the terms "vertical" and "horizontal" are not intended to imply any physical structure and are not intended to be limiting.

The preceding discussion describes vertical check blocks generated from cross-block bits in a single TB. Vertical check blocks may also be generated from cross-block bits over two or more TBs (e.g., TBs sent as separate packets by a single source). To assist in understanding this further application, a discussion of network coding is provided.

Network coding is a networking technique in which transmitted data is encoded and decoded to help increase network throughput, help reduce delays and/or help improve robustness of the wireless network. Instead of treating two packets as distinct, discrete units of information (as in traditional network routing), network coding enables the two packets to be combined (using a certain defined algebraic algorithm, such as via bit-wise X-OR operation) and the accumulated message delivered to a destination. At the destination, the accumulated message is decoded (using the same defined algorithm). The two packets that are combined in this way may be from two different transmitting nodes, or two different transmitting sources (e.g., two different antennas, two different transmitters, or two different communication interfaces) of the same source or different sources. The two packets may be intended for the same destination, or two different destinations (e.g., two different receiving nodes). In the case where the two packets are intended for two different destinations, additional information may be used at each destination in order to decode and obtain only the packet intended for that destination.

When vertical check blocks are used with network coding, a given vertical check block is generated from bits taken across two or more CBs or two or more packets (which may come from single TB or multiple TBs).

Figure 7:
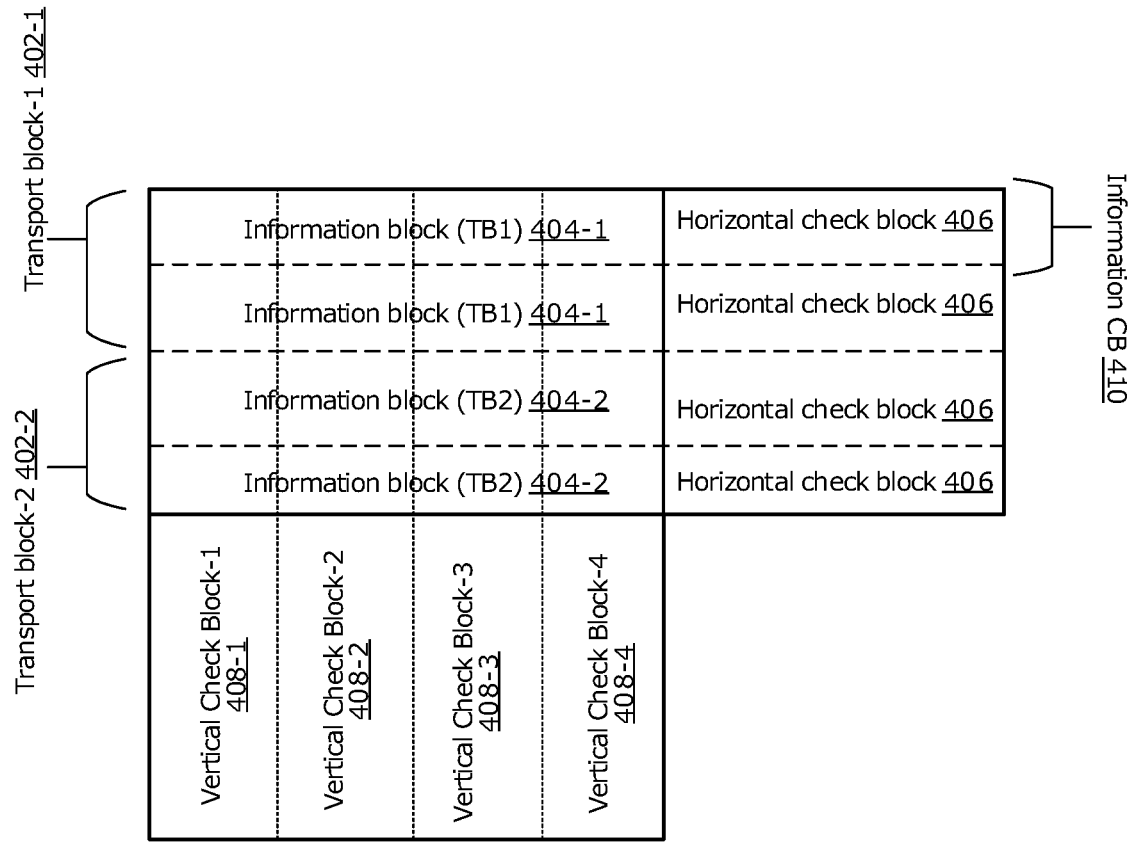
FIG. 7 illustrates an example code structure for generating vertical check blocks from multiple TBs.

FIG. 7 illustrates an example code structure similar to that of FIGS. 4A and 4B. However, unlike FIGS. 4A and 4B, the structure in FIG. 7 includes multiple TBs, in this example TB-1 402-1 and TB-2 402-2 (generally referred to as TB(s) 402). It should be noted that the TB(s) 402 are not necessarily sent in the same transmission. In this example, two TBs 402 are shown for simplicity, however this is not intended to be limiting. TB-1 402-1 has encoder input bits arranged in rows forming information blocks 404-1 (in this example, two information blocks 404-1 are shown for simplicity, however this is not intended to be limiting), and TB-2 402-2 has encoder input bits arrange in rows forming information blocks 404-2 (in this example, two information blocks 404-2 are shown for simplicity, however this is not intended to be limiting). The information blocks 404-1, 404-2 may be generally referred to as information block(s) 404. It should be noted that the number of information blocks 404 in each TB 402 is not necessarily equal. In this example, systematic code is shown, and a horizontal check block 406 is generated from each information block 404. In examples using non-systematic code, there may not be any horizontal check block 406 distinct from the information block 404.

Vertical check blocks 1-4 408-1 to 408-4 (generally referred to as vertical check block(s) 408) are each generated using one or more columns of bits taken across all information blocks 404 (and thus across all TBs 402). That is, each vertical check block 408 is generated from a set of bits that include at least one bit from each information block 404 of each TB 402. In this example, four vertical check blocks 408 are shown for simplicity, however this is not intended to be limiting. The number of vertical check blocks 408 to be used may be based on configuration at the transmitter (e.g., the BS 170 for DL transmissions, or the ED 110 for UL or SL transmissions) and/or defined by a standard. Further, the number of vertical check blocks 408 may or may not be equal to the number of horizontal check blocks 406.

Similarly to the discussion above with respect to FIGS. 5A, 5B and 6, vertical check blocks 408 that are generated across multiple TBs 402 may be generated based on the information bits in their natural order, or based on shuffled (or interleaved) bits. Multiple sets of vertical check blocks 408 may be generated for the same set of TBs 402, using different interleavers (e.g., for different retransmissions). The vertical check blocks 408 may be generated for systematic or non-systematic code.

Information CBs 410 may originate from a source, which may be a network node (e.g., a BS 170 or an ED 110), or a transmitting device (e.g., a transmitting antenna or transmitter chain) of a network node. In general, the term network node in the present disclosure may refer to any transmitting and/or receiving node (including relay nodes) in the wireless network, and may include end nodes (e.g., terminal devices such as an ED 110), as well as nodes that are further uplink (e.g., BS 170 or relays). One skilled in the art would understand that other variations are possible within the scope of the present disclosure.

Each TB may have respective numbers of information CBs. In the present disclosure, information CBs may be referred to simply as CBs. In some examples, a vertical check block may be generated using bits selected (e.g. using an interleaver) from all the CBs of a TB. In other examples, a vertical check block may be generated using bits selected from at least two but fewer than all the CBs of a TB. For example, a given interleaver may indicate selection of bits from fewer than all CBs (e.g., selection of bits only from CBs that were not successfully decoded by the receiving node), for generating a vertical check block.

The present disclosure describes methods and apparatuses for performing multicast, broadcast or groupcast transmissions using 2D coding. In particular, instead of retransmitting each CB separately, one or more vertical check blocks of multiple CBs are retransmitted. Compared to existing retransmission schemes, the examples disclosed herein provide improved performance such as reduced latency, reduced overhead, or more efficient decoding.

In the present disclosure, the first transmission of a TB or packet, referred as an initial transmission, includes communication of information CBs, (including the horizontal check block(s) in the case of systematic code), from transmitting node to receiving node. A subsequent communication related to the same TB or packet, referred to as a retransmission of the TB or packet, includes sending one or more vertical check blocks from transmitting node to receiving node. It should be noted that the initial transmission may, in some examples discussed herein, include one or more vertical check blocks.

Because vertical check blocks are generated using bits from multiple CBs, retransmission of one vertical check block can provide information to help decode multiple CBs. At the receiving node, soft information from failed decoding attempts can be kept and combined with information from a vertical check block to help decode multiple CBs. The ability to utilize soft information from unsuccessful decoding attempts provides significant performance gain over erasure outer code and fountain code. This also means that a single vertical check block can be multicasted or broadcasted to different receivers and be used by the different receivers for decoding, even if the different receivers have different erroneous CBs in the initial transmission.

The present disclosure describes examples that may help to reduce the redundancy and feedback required for retransmissions in broadcast or multicast, compared to conventional TB or CB-group based HARQ. Examples disclosed herein may be implemented in feedback-based schemes as well as rateless code.

Example uses of vertical check blocks in broadcast, multicast or groupcast transmission applications are now described. The following examples are described and shown with certain numbers of participating entities (e.g., source, transmitter, destination, relay, terminal device, UE, etc.). The specific numbers shown are not intended to be limiting. For example, there may be any number of an entity shown in plural (e.g., two or more). Although not discussed in detail, different interleavers may be used to generate different vertical check blocks for HARQ retransmissions.

In examples disclosed herein, the retransmission(s) performed by a transmitter (or transmitting node) (Tx) may be according to predetermined parameters. Parameters for performing retransmissions include: number of retransmissions to be performed (which can be predetermined), which interleavers to use for generating respective vertical check blocks, number of vertical check blocks to include in each retransmission, among others. Retransmission parameters may be predefined (e.g., defined in the standard), semi-statically configured (e.g., configured by higher layer signaling, such as radio resource control (RRC) signaling). In examples where the Tx is an ED 110, retransmission parameters may be semi-statically (e.g., configured grant) or dynamically indicated (e.g., dynamic scheduling) by configuration signaling from the BS 170. Semi-static configuration may be signaled using higher layer signaling, such as radio resource control (RRC) signaling, for example. Dynamic indication may be signaled using physical layer (or layer-1) signaling, such as downlink control information (DCI) transmissions, for example.

In order for a receiving node to properly make use of vertical (and horizontal) check blocks for decoding, the receiver (or receiving node) (Rx) also need information about how the vertical check blocks were generated. Information about the parameters used for generating vertical check block(s) (also referred to as vertical check block parameters) may be signaled to each Rx prior to, during, together with, or immediately following the retransmission. If the Tx is the BS 170, information about parameters used for generating the vertical check block(s) may be signaled in DCI or RRC, for example, similar to that described above. If the Tx is an ED 110, information about the vertical check block parameters may be signaled to other receiving EDs 110 using sidelink RRC or PC5-RRC (in the case of semi-statically configured parameters) or using sidelink control information (SCI) over a sidelink control channel (in the case of dynamically indicated parameters). If the Tx is an ED 110, and the transmission from the Tx to Rx (which may be another ED 110) is scheduled by the network (or BS 170), the information about vertical check block parameters may also be signaled from the BS 170 to the Tx, which can be signaled semi-statically (e.g., in RRC) or dynamically (e.g., in DCI). In other examples, a Tx ED may select some or all the vertical check block parameters, in which case that information may not need to be conveyed/scheduled by the network/BS 170 to the Tx ED.

Information that may be signaled include: New Data Indicator (NDI) to indicate whether the transmission is a new (initial) transmission or a retransmission; the HARQ process ID to identify the set of transmission/retransmissions that belongs to the same HARQ process; predetermined number of repetitions/blind retransmission (if applicable); and parameters for generating vertical check blocks. Example vertical check block parameters that may be signaled include: number of vertical check blocks transmitted per retransmission; index of the CBs and numbers of the CBs to use for generating vertical check block (may be omitted if all CBs are used to generated the vertical check block); interleaver used for generating vertical check block; and which bits/sub-blocks of each CBs are used to generate the vertical check block. In some examples, the parameters for generating vertical check block(s) for a given retransmission may be predefined according to the redundancy version (RV) of the retransmission, in which case the signaling may indicate the RV of the retransmission. The RV index or a RV sequence corresponding to multiple transmissions/retransmissions of the TB may also be signaled. Information about interleaver(s) used for generating vertical check block(s) may be transmitted in the form of a seed (or index) of one or more interleavers in a preconfigured and known (e.g., standards-defined) set of available interleavers.

Any of the information described above may be predefined in a standard and/or preconfigured in network systems/devices, thus being known to both transmitting and receiving nodes. In some examples, different options or parameter values may be defined by standards, and signaling (e.g., RRC, PC5-RRC, DCI or SCI) may be used to indicate (e.g., by referencing an index value) the particular option or parameter value to use. Different types of signaling (e.g., RRC, PC5-RRC, DCI or SCI) may be used to indicate shorter term changes (e.g., selecting a particular interleaver to use) or longer term changes (e.g., changing the number of predetermined retransmissions).

The present disclosure may, in some examples, make reference to TBs or packets. It should be understood that discussion of in the context of TBs may be similarly applicable to packets (and vice versa).

Figure 8A:
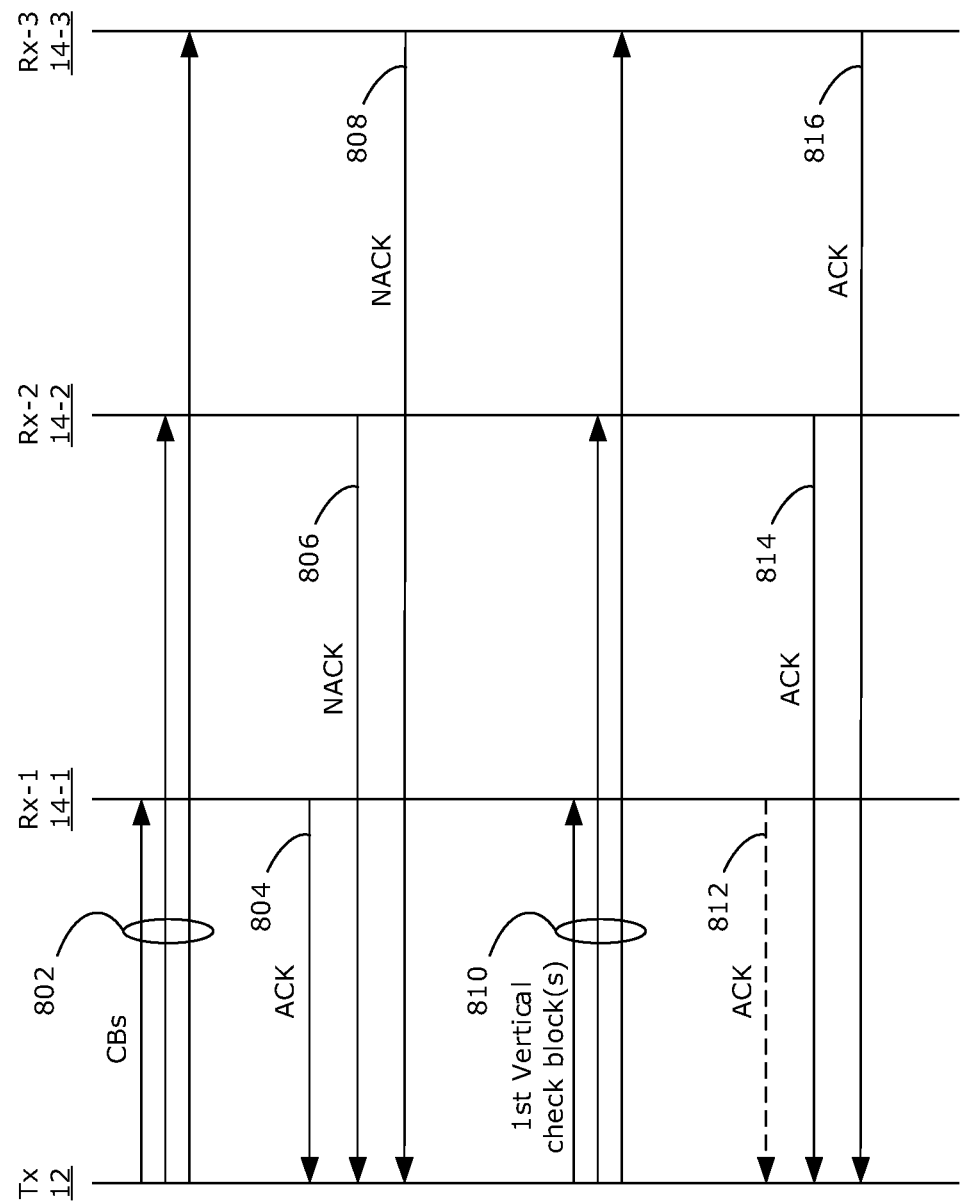
FIGS. 8A and 8B are signaling diagrams illustrating examples of using vertical check blocks for broadcast, multicast or groupcast transmissions.

FIG. 8A is a signaling diagram illustrating an example using vertical check blocks in a feedback-based retransmission scheme. It should be noted that, although FIG. 8A (and other examples disclosed herein) is described in the context of transmission to multiple receiving nodes (e.g., multicast, broadcast or groupcast transmissions), the signaling described herein (including configuration or control signaling) may also be applicable to unicast transmissions (i.e., transmission to a single receiving node). In FIG. 8A, a transmitting node 12 (denoted as Tx 12) is transmitting to multiple receiving nodes (denoted as Rx-1 14-1, Rx-2 14-2 and Rx-3 14-3, generally referred to as Rx 14). The transmissions from the Tx 12 may be multicast, broadcast or groupcast transmissions. The Tx 12 may be a BS 170 (e.g., for broadcast or multicast DL transmissions to EDs 110) or may be an ED 110 (e.g., for groupcast SL transmissions to other EDs 110). In some examples, if the Tx 12 is an ED 110, one of the Rx 14 may be a BS 170 (e.g., an UL transmission) while others of the Rx 14 may be other EDs 110. Although not shown, the Tx 12 may transmit a configuration signal or control signal to the Rx 14 (e.g., prior to the initial transmission, prior to a retransmission, during a retransmission, together with the retransmission, or immediately following a retransmission) to provide information about the parameters used for generating the vertical check blocks. Such information may be necessary for the Rx 14 to make use of the vertical check blocks to help in decoding. For example, Tx 12 may send the control information which includes the vertical check block parameters in a sidelink control information (SCI). The SCI may be transmitted in a physical sidelink control channel (PSCCH) that is associated with the data transmission in a physical sidelink shared channel (PSSCH), or the SCI may be transmitted in PSSCH together with the data transmission. The Rx 14 may first decode the SCI to obtain the control information, which include the vertical check block parameters, and use the obtained control information to further decode the data. The information included in the configuration or control signal may include, for example, NDI to indicate whether the transmission is a new (initial) transmission or a retransmission; the HARQ process ID to identify the set of transmission/retransmissions that belongs to the same HARQ process; predetermined number of repetitions/blind retransmission (if applicable); and parameters for generating vertical check blocks. Example vertical check block parameters that may be signaled include: number of vertical check blocks transmitted per retransmission; index of the CBs and numbers of the CBs to use for generating vertical check block (may be omitted if all CBs are used to generated the vertical check block); interleaver used for generating vertical check block; and which bits/sub-blocks of each CBs are used to generate the vertical check block. In some examples, the parameters for generating vertical check block(s) for a given retransmission may be predefined according to the RV of the retransmission, in which case the signaling may indicate the RV of the retransmission. The RV index or a RV sequence corresponding to multiple transmissions/retransmissions of the TB may also be signaled. Information about interleaver(s) used for generating vertical check block(s) may be transmitted in the form of a seed (or index) of one or more interleavers in a preconfigured and known (e.g., standards-defined) set of available interleavers.

At 802, the Tx 12 sends a packet or TB containing multiple encoded CBs (which includes information bits and horizontal check blocks of each CB, in the case of systematic code) to all intended Rx 14. The transmission at 802 may be a broadcast, multicast or groupcast transmission. Each Rx 14 attempts to decode the received packet or TB.

Each Rx 14 sends back ACK/NACK feedback depending on whether the TB or packet was successfully decoded. In this example, Rx-1 14-1 successfully decoded the packet or TB, and sends back ACK at 804. Rx-2 14-2 and Rx-3 14-3 failed to decode the packet or TB and each sends back a NACK at 806 and 808, respectively. Notably, Rx-2 14-2 and Rx-3 14-3 may fail to decode different CBs of the packet or TB. For example, as shown in FIG. 8D, if the packet or TB sent by the Tx 12 at 802 contains CBs 1-9, Rx-2 14-2 may fail to decode CB2 and CB8 (indicated by crossed-out CB2 and CB8), while Rx-3 14-3 may fail to decode CB1, CB2 and CB6 (indicated by crossed-out CB1, CB2 and CB6).

Returning to FIG. 8A, if at least one of the Rx 14 indicates unsuccessful decoding of the TB or packet (e.g., one of the feedback indicates NACK), the Tx 12 at 810 retransmits one or more vertical code blocks. The vertical code block(s) are generated from the TB or packet that was sent in the initial transmission (at 802), and may be generated according to predefined parameters (e.g., interleaver). In some examples, the Tx 12 may tailor the retransmission at 810 to exclude Rx 14 that feedback ACK (in this example, Rx-1 14-1), for example in the case of a multicast or groupcast retransmission. In other examples, the Tx 12 may send the retransmission at 810 to all Rx 14. For example, as shown in FIG. 8D, a first vertical check block (VCB1) is retransmitted at 810 to all the Rx 14 (although, as noted above, more than one vertical check block may be retransmitted at 810). Notably, the same vertical code block is transmitted to Rx-2 14-2 and Rx-3 14-3 at 810, despite Rx-2 14-2 and Rx-3 14-3 having different undecoded CBs.

Each Rx that failed to decode the initial transmission (in this example, Rx-2 14-2 and Rx-3 14-3) uses the received vertical check block(s) with the initially received TB and soft information from the previous decoding attempt, to combine them to re-attempt decoding of the undecoded CBs. A Rx that has already successfully decoded the TB (in this example, Rx-1 14-1) may ignore the retransmission.

In this example, the vertical check block(s) enables both Rx-2 14-2 and Rx-3 14-3 to successfully decode the TB. Notably, Rx-2 14-2 and Rx-3 14-3 can use the same vertical check block(s) even though they each failed to decode different CBs. The same vertical check block(s) can help decode any erroneous CB, even different erroneous CBs at different Rx 14. Further, a single vertical check block may be transmitted. One single vertical check block may be sufficient to help successfully decode multiple erroneous CBs, because soft information from previous decoding attempts of the erroneous CBs is kept and can be used in subsequent decoding attempts. It may be noted that the number of vertical check block(s) that are included in a single retransmission may be fewer than the number of undecoded CBs in the initial transmission, but the number can be more than one.

Returning to FIG. 8A, Rx-2 14-2 and Rx-3 14-3 then send back ACK at 814 and 816, respectively. Optionally, Rx-1 14-1 may also send back ACK again at 812, to confirm successful decoding. After the Tx 12 receives ACK feedback from all Rx 14, retransmission may end.

The example of FIG. 8A demonstrates some advantages of the presently disclosed retransmission schemes compared to existing retransmission schemes.

For example, if using conventional TB based HARQ, the entire TB would need to be retransmitted in a retransmission. This means there can be significant redundancy. For example, if only one CB failed to be decoded, only one CB in the retransmission provides useful information, and the other CBs are redundant and wastes transmission resources (e.g., time-frequency resources).

Another existing retransmission scheme is referred to as code block group (CBG) based HARQ. CBG based HARQ retransmission is similar to TB based HARQ, however instead of retransmitting the entire TB, the TB is divided into groups of multiple CBs (referred to as a CBG) and only the CBG containing the undecoded CB is retransmitted. However, there is significant feedback overhead incurred because each receiving node must notify the transmitting node which CB needs to be retransmitted, in order for the transmitting node to identify which CBG to retransmit. Further, if there are undecoded CBs belonging to different CBGs, then multiple CBGs need to be retransmitted, which again increases redundancy. In addition, in case of broadcast/multicast/groupcast, as there are multiple receiving nodes, different receiving nodes are likely to have errors in different CBGs. In this case, all the CBGs having indicated error from any receiving node would need to be retransmitted. For example, in example shown in FIG. 8D, if CBG-based HARQ is used, CB1, CB2, CB3 might be grouped into one CBG (e.g., CBG1); CB4, CB5, CB6 might be grouped into another CBG (e.g., CBG2); and CB7, CB8, CB9 might be grouped into a third CBG (e.g., CBG3). Then, after the first round of feedback, the Tx 12 would need to retransmit CBG1 and CBG3 to Rx-2 14-2 (because Rx-2 14-2 failed to decode CB2 which belongs to CBG1, and failed to decode CB8 which belongs to CBG3), and CB1 and CB2 to Rx-3 14-3 (because Rx-3 14-3 failed to decode CB1 and CB2 which belong to CBG1, and failed to decode CB6 which belongs to CBG2). This means that the Tx 12 would need to retransmit all 3 CBGs, which means the full TB would need to be retransmitted even with the increased feedback overhead. In such an example, which may not be unlikely for a broadcast/multicast/groupcast transmission, CBG-based HARQ fails to provide any efficiency.

Another existing retransmission scheme is erasure outer code. However, as discussed previously, this approach does not utilize soft information from previous decoding attempts to help in a current decoding attempt, thus performance is not as good as the examples disclosed herein. Further, erasure outer code is designed for transmissions over erasure channels, and has impaired performance over non-erasure channels. In addition, if any receiving node lost or unsuccessfully decoded K CBs in the initial transmission (where K is a positive integer), the Tx needs to send at least K parity code blocks generated using erasure outer code in the retransmission for the receiving node to recover the K lost CBs. This may be avoided if vertical check blocks are used in retransmission instead, as disclosed herein. In the example of FIG. 8D, Rx-3 14-3 failed to decode 3 CBs (CB1, CB2, CB6) in the first transmission. Therefore, if erasure outer code is used, at least 3 parity CBs would need to be retransmitted to recover the 3 information CBs. However, by using vertical check block-based retransmission, as discussed herein, it is possible to only retransmit one vertical check block and Rx-3 14-3 would be able to recover all the CBs after one retransmission.

Figure 8B:
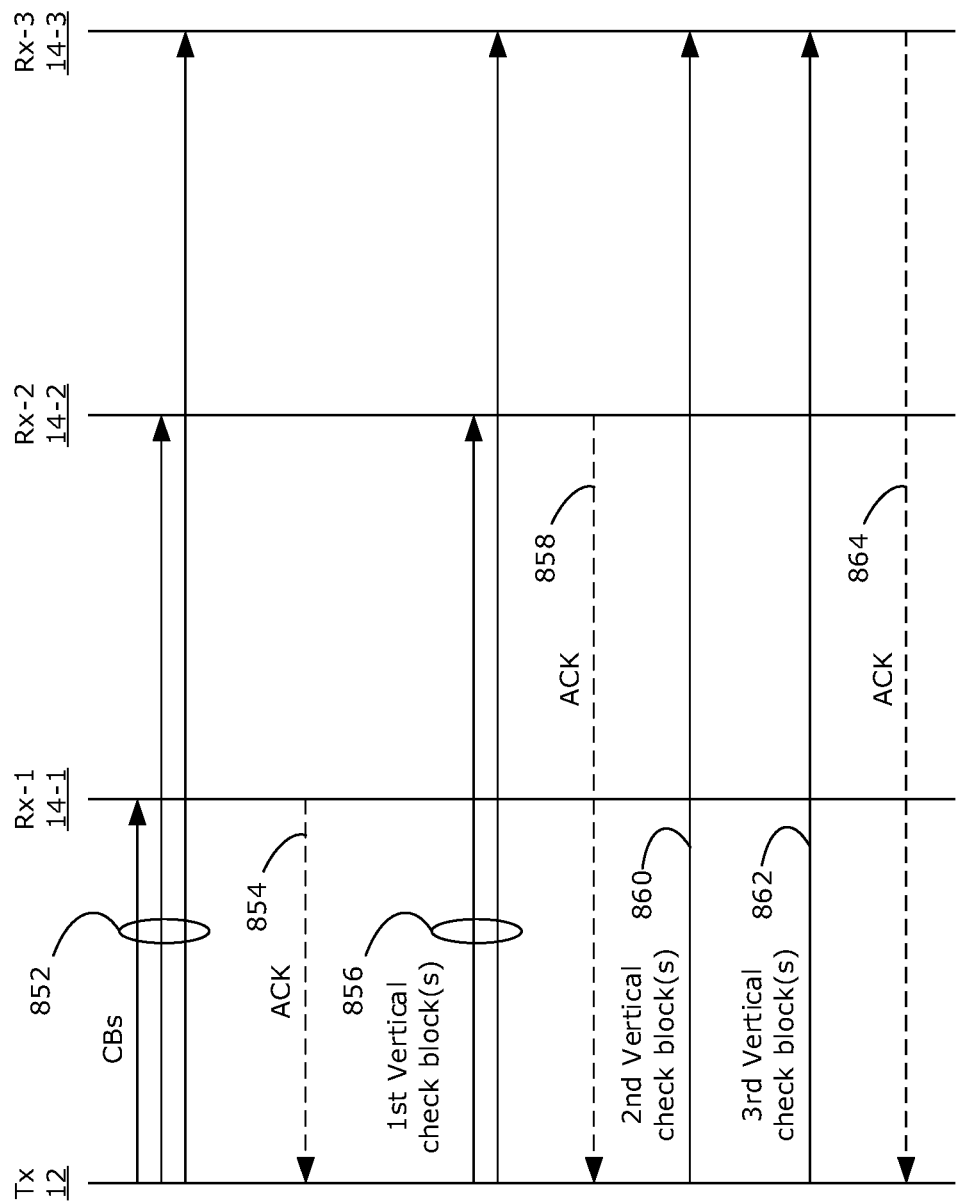

FIG. 8B is a signaling diagram illustrating another example using vertical check blocks in a ACK/NACKless retransmission scheme. In ACK/NACKless retransmission, feedback from receiving nodes is optional or omitted. ACK/NACKless retransmission schemes may be used for rateless codes. Broadcast transmissions may benefit from ACK/NACKless retransmission schemes, because a transmitting node may broadcast to a large number of unknown receiving nodes. FIG. 8B is similar to FIG. 8A, involving a transmitting node 12 (denoted as Tx 12) transmitting to multiple receiving nodes (denoted as Rx-1 14-1, Rx-2 14-2 and Rx-3 14-3, generally referred to as Rx 14). The transmissions from the Tx 12 may be multicast, broadcast or groupcast transmissions. The Tx 12 may be a BS 170 (e.g., for broadcast or multicast DL transmissions to EDs 110) or may be an ED 110 (e.g., for groupcast SL transmissions to other EDs 110). In some examples, if the Tx 12 is an ED 110, one of the Rx 14 may be a BS 170 (e.g., an UL transmission) while others of the Rx 14 may be other EDs 110. Although not shown, the Tx 12 may transmit a configuration signal or control signal to the Rx 14 (e.g., prior to the initial transmission, prior to a retransmission, during a retransmission, together with a retransmission, or immediately following a retransmission) to provide information about the parameters used for generating the vertical check blocks. Such information may be necessary for the Rx 14 to make use of the vertical check blocks to help in decoding.

At 852, the Tx 12 sends a packet or TB containing multiple encoded CBs to all intended Rx 14. The transmission at 852 may be a broadcast, multicast or groupcast transmission. Each Rx 14 attempts to decode the received packet or TB.

Similar to rateless code, there may be no PHY layer ACK/NACK feedback from the Rx 14 after each transmission. An optional higher layer ACK may be transmitted from a Rx 14 if the TB was successfully decoded. In this example, Rx-1 14-1 successfully decoded the TB, and optionally sends back ACK at 854. Rx-2 14-2 and Rx-3 14-3 failed to decode the TB, and send no feedback. Notably, Rx-2 14-2 and Rx-3 14-3 may fail to decode different CBs of the TB. For example, as shown in FIG. 8E, if the TB sent by the Tx 12 at 852 contains CBs 1-9, Rx-2 14-2 may fail to decode CB2 and CB8 (indicated by crossed-out CB2 and CB8), while Rx-3 14-3 may fail to decode CB1, CB2 and CB6 (indicated by crossed-out CB1, CB2 and CB6).

The Tx 12 may be configured to send a predetermined number of retransmissions. The Tx 12 may further be configured to use predetermined parameters for generating the vertical code block(s) for each retransmission. The Tx 12 may send the predetermined number of retransmissions until an optional higher layer ACK is received from each Rx 14. Or the Tx 12 may send the predetermined number of retransmission regardless of any feedback (or whether there is any feedback). The Tx 12 may transmit a retransmission only to those Rx 14 that did not send a higher layer ACK (e.g., for a multicast or groupcast retransmission). Sending a predetermined number of retransmission that is not triggered by feedback (or without receiving feedback between transmission/retransmissions) may be referred to as repetition or blind retransmission.

Figure 8C:
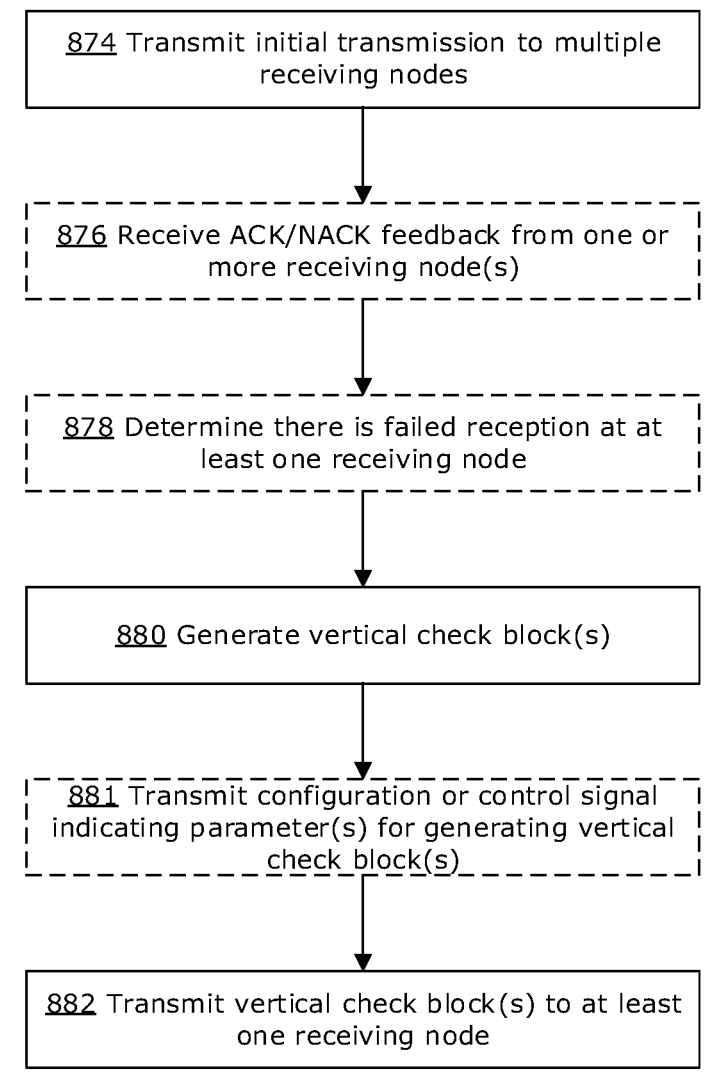
FIG. 8C is a flowchart illustrating an example method that may be performed by a transmitting node, in accordance with FIGS. 8A and 8B.
Figure 8D:
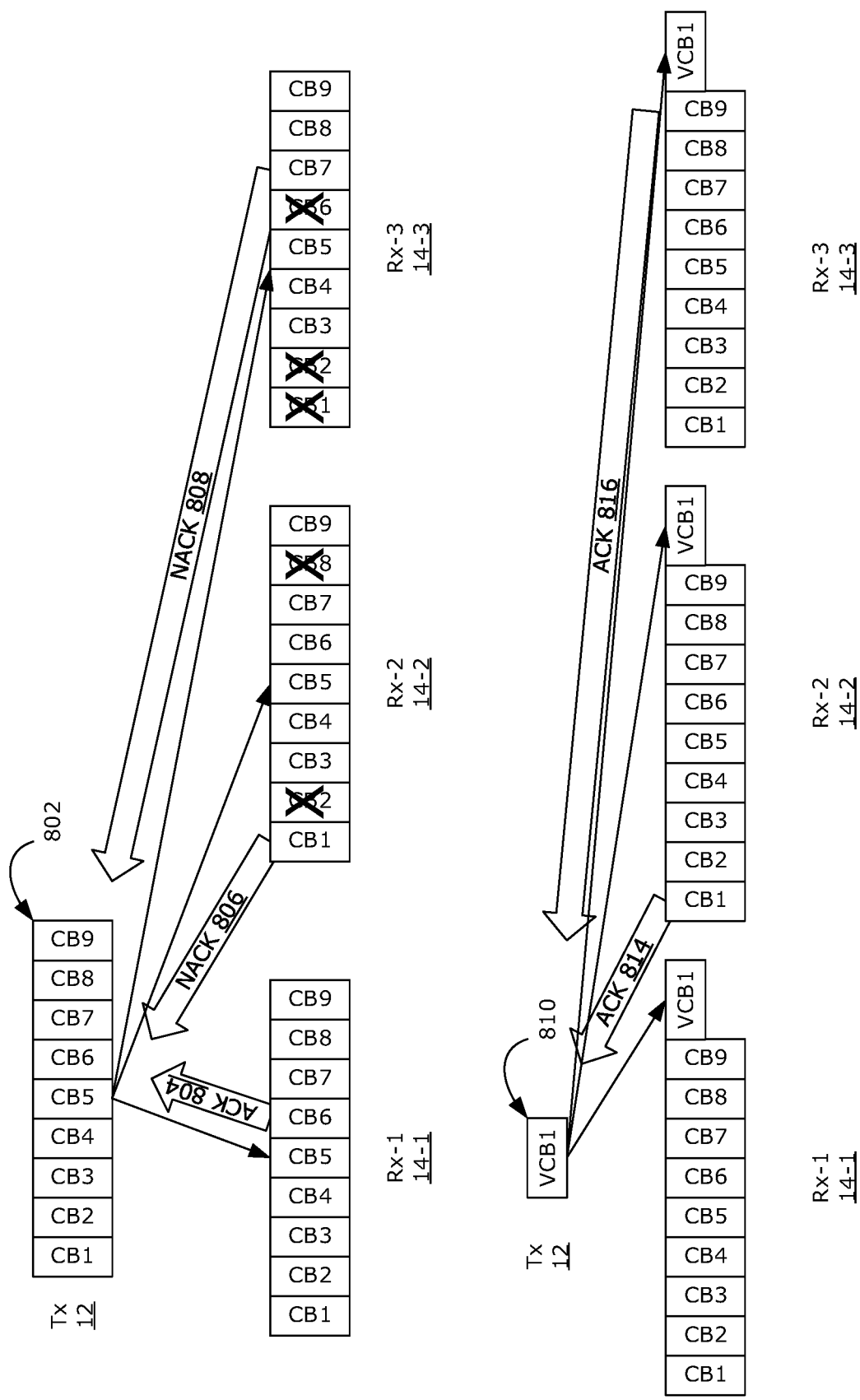
FIGS. 8D and 8E illustrate examples of the code blocks transmitted in the examples of FIGS. 8A and 8B.
Figure 8E:
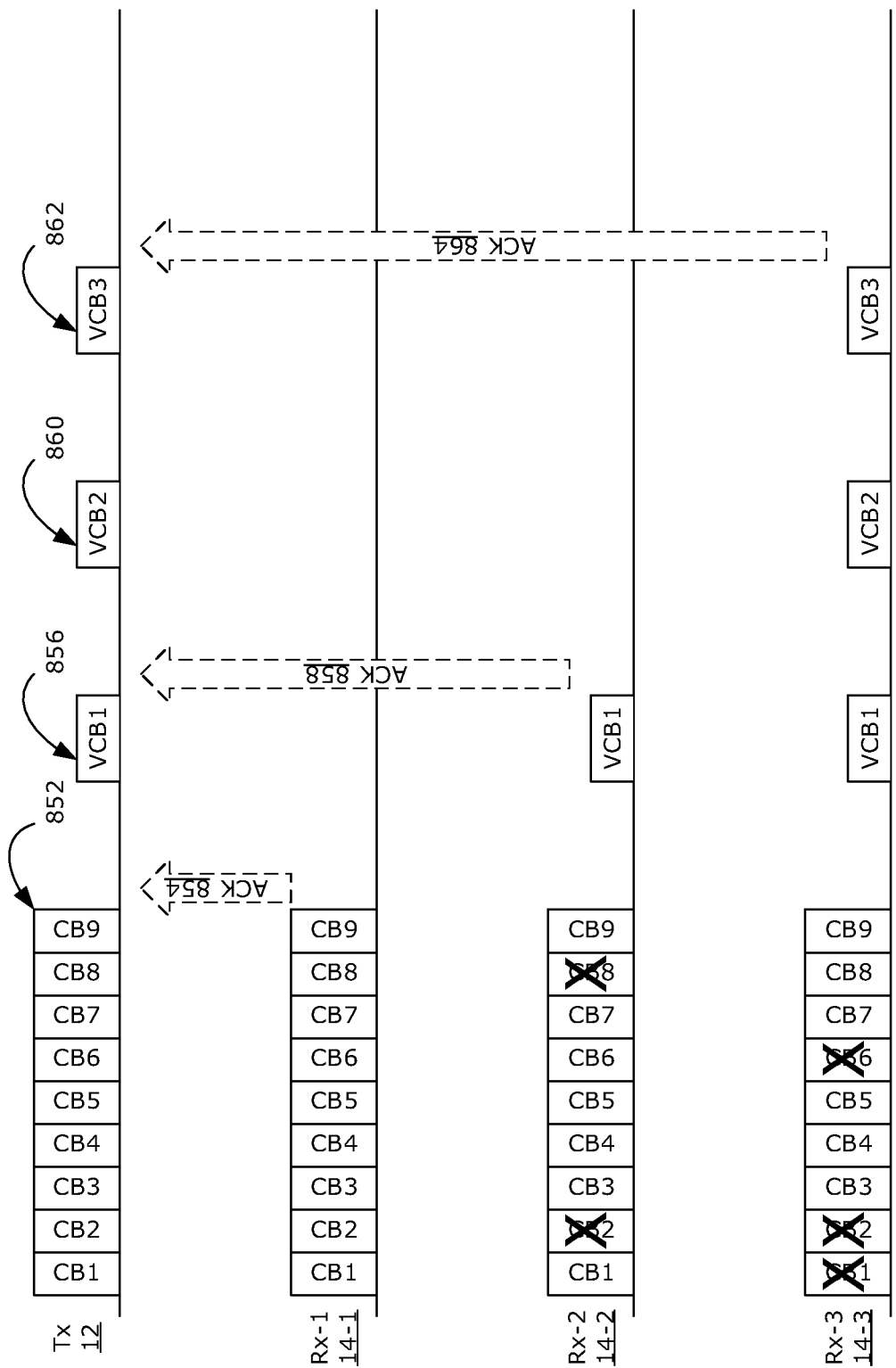

As shown in both FIGS. 8B and 8E, in this example, the Tx 12 receives a higher layer ACK from Rx-1 14-1, but no feedback from Rx-2 14-2 and Rx-3 14-3. At 856, the Tx 12 retransmits one or more vertical code blocks (indicated as VCB1 in FIG. 8E) only to Rx-2 14-2 and Rx-3 14-3. The vertical code block(s) are generated from the TB or packet that was sent in the initial transmission (at 852), and may be generated according to predefined parameters (e.g., interleaver). The retransmission at 856 transmits the same vertical check block(s) to Rx-2 14-2 and Rx-3 14-3.

Each Rx that failed to decode the initial transmission (in this example, Rx-2 14-2 and Rx-3 14-3) uses the received vertical check block(s) with the initially received TB and soft information from the previous decoding attempt, to re-attempt decoding of the undecoded CBs. In this example, Rx-2 14-2 successfully decodes the TB using the vertical check block(s) and soft information from the previous decoding attempt, and optionally sends back ACK at 858. Rx-3 14-3 still does not successfully decode the TB and sends no feedback.

The Tx 12 continues to transmit the predetermined number of retransmissions at 860 and 862. A different set of vertical check block(s) is transmitted at each retransmission 860, 862 (indicated as VCB2 and VCB3, respectively, in FIG. 8E). For example, each set of vertical check block(s) may be generated using different parameters (e.g., different interleavers). In some examples, the retransmissions end after the predetermined number of retransmissions (in this example, three retransmissions) is complete, even though no ACK has been received from Rx-3 14-3. In another example, the number of retransmissions are not predetermined, and the Tx 12 continues sending additional vertical check block(s) until the Tx 12 receives an ACK from all the Rx 14. For example, in the case where the optional ACKs are transmitted in FIGS. 8B and 8E, the Tx 12 may keep sending one (or more) vertical check block at a time. After the third retransmission (e.g., after sending the third vertical check block VCB3), the Tx 12 receives an ACK from Rx-3 14-3. Together with the ACK the Tx 12 received from Rx-1 14-1 and Rx-2 14-2 earlier (at 854 and 858), the Tx 12 determines that ACK have been received from all intended Rx 14 and the Tx 12 stops sending more vertical check blocks. In some examples, the Tx 12 may be scheduled to send a predetermined maximum number of retransmissions or vertical check blocks, and stops sending more vertical check blocks if either the maximum number of retransmissions or vertical check blocks has been reached, or an ACK is received from all intended Rx 14.

FIG. 8C is a flowchart illustrating an example method 870 that may be performed by the transmitting node, in accordance with the signaling examples of FIGS. 8A and 8B.

At 874, the Tx 12 transmits an initial transmission to multiple intended Rx 14 (e.g., at signals 802 of FIGS. 8A and 8B). The initial transmission may be a broadcast, groupcast or multicast transmission. The initial transmission includes multiple information CBs.

Optionally, at 876, feedback may be received from one or more Rx 14. For example, in a feedback-based retransmission scheme, each Rx 14 may be required to send back ACK/NACK feedback to the Tx 12 (e.g., at signals 804, 806, 808 of FIG. 8A). In an ACK/NACKless retransmission scheme, ACK feedback may be optional (e.g., at signal 854 of FIG. 8B) and there may be no NACK feedback.

Optionally, at 878, the Tx 12 determines whether there is failed reception by at least one Rx 14. Failed reception at one Rx 14 means that the Rx 14 was unable to successfully decode at least one of the information CBs. In the case of a feedback-based retransmission scheme, the Tx 12 can determine that at least one Rx 14 failed to successfully decode the CBs if at least one NACK is received at step 876. In the case of an ACK/NACKless retransmission scheme, the Tx 12 can determine that at least one Rx 14 failed to successfully decode the CBs if the Tx 12 does not receive ACK from all intended Rx 14. Depending on the feedback received at step 876, the Tx 12 may also identify which Rx 14 experienced the failed reception.

In some examples, such as in a broadcast scenario, the Tx 12 may not receive any feedback from any Rx 14, and instead the Tx 12 may perform a predetermined number of retransmissions (also referred to as a blind retransmission scheme). In such cases, steps 876 and 878 may be omitted.

At 880, the Tx 12 generates one or more vertical check blocks. The vertical check block(s) are generated using bits selected from at least two of the CBs that were transmitted in the initial transmission at step 874. It should be noted that the vertical check block(s) may be generated any time during the method 870 prior to transmission of the vertical check block(s). For example, the vertical check block(s) may be generated prior to the initial transmission, or following optional steps 876 and 878.

Optionally, at 881, a configuration signal or control signal (e.g., RRC signal, PC5-RRC signal, DCI transmission or SCI transmission) may be transmitted by the Tx 12 to provide the Rx 14 with information about the parameter(s) for generating vertical check block(s). Information about how the vertical check block(s) are generated will enable each Rx 14 to use the vertical check block(s) (which will be transmitted in a retransmission) to help decode the information CBs in the initial transmission. The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously. The configuration or control signal may be received prior to or at the start of the method 870, or any time during the method 870 including during, together with, or following transmission of the vertical check block(s) to the Rx 14. For example, step 881 may take place during step 882.

In some examples, a configuration signal or control signal may not need to be transmitted and step 881 may be omitted. For example, the parameters for generating vertical check block(s) may be predetermined (e.g., defined in a standard) and does not need to be communicated from the Tx 12 to each Rx 14.

At 882, at least one vertical check block is transmitted to at least one Rx 14. The vertical check block(s) may be transmitted to multiple Rx 14 (e.g., in a broadcast, multicast or groupcast, similar to the initial transmission). In some examples, the vertical check block(s) may be transmitted in a broadcast, multicast or groupcast to all Rx 14 regardless of whether a given Rx 14 successfully or unsuccessfully decoded the initial transmission (e.g., at signals 810 of FIG. 8A). In other examples, the vertical check block(s) may be transmitted in a multicast or groupcast only to those Rx 14 that were determined (at optional step 878) to have failed to successfully decode the initial transmission (e.g., at signals 856 of FIG. 8B).

Further steps of optionally receiving feedback and transmitting subsequent retransmission(s) may be performed as appropriate (e.g., up to a predetermined number of retransmissions).

The examples disclosed herein may also be applicable to multicast or groupcast transmissions in V2X communications. It should be noted that although this discussion is provided in the context of V2X communications, the examples may also be applicable to other applications. The NR-V2X standard defines certain resource allocation modes and options for V2X groupcast. Two modes are defined for resource allocation for the transmitting node (which, in V2X, is a vehicle). In mode 1, the BS 170 schedules resources to be used by the transmitting node for the initial transmission and any subsequent retransmission. The transmitting node can report back (e.g., acknowledgement (ACK) or negative acknowledgement (NACK)) to the BS 170 in order to have additional resources scheduled for retransmission. In mode 2, the transmitting node selects resources to use for transmission and subsequent retransmission from a preconfigured resource pool.

Figure 9A:
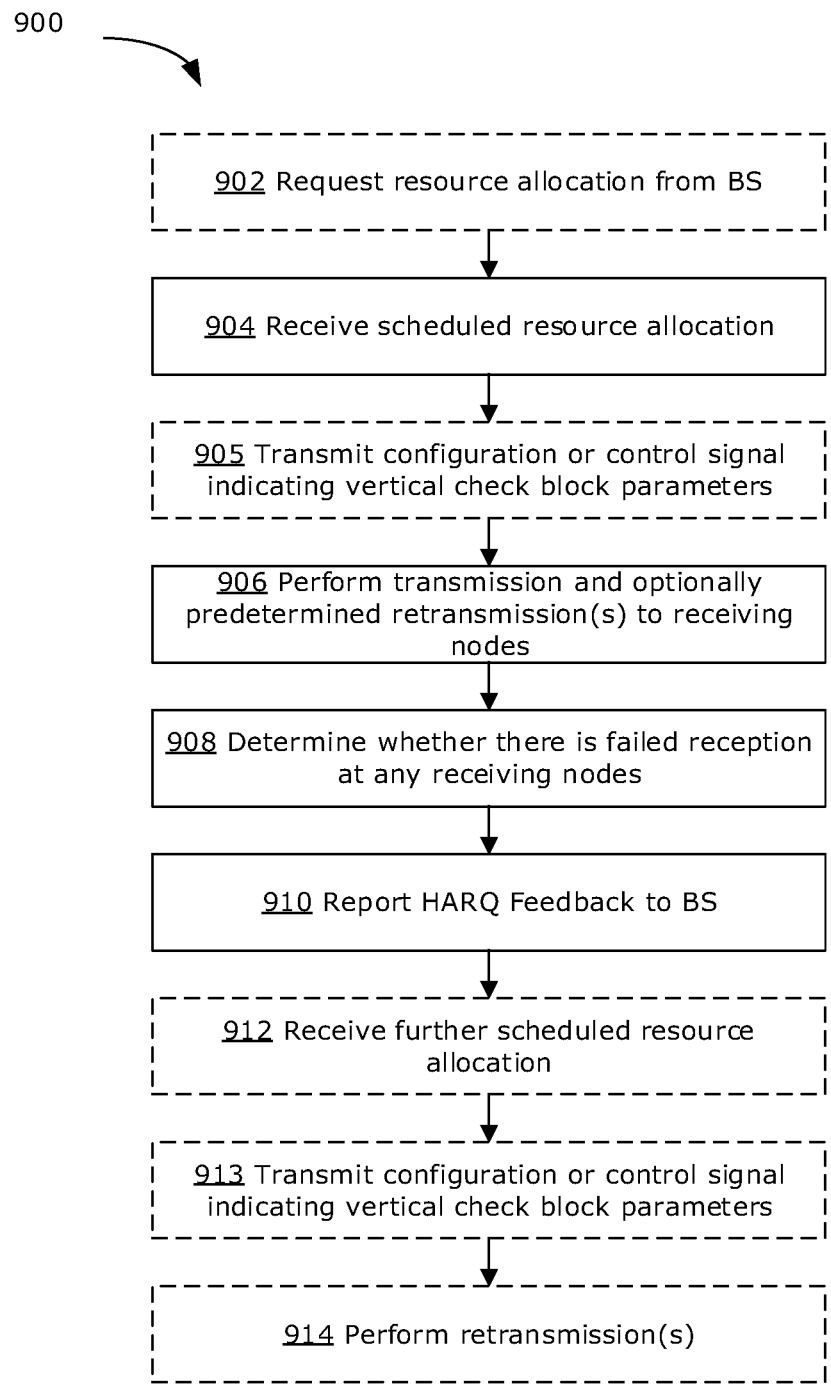
FIGS. 9A and 9B are flowcharts illustrating example methods that may be performed by a transmitting node, for obtaining resources for transmission and retransmission, in a groupcast scenario.

FIG. 9A is a flowchart illustrating an example method 900 that may be performed by the transmitting node, for multicast or groupcast communications using mode 1 as defined in NR-V2X. The transmitting node may be a network-enabled vehicle, or more generally denoted as Tx. The multicast or groupcast communications is to multiple receiving nodes (generally denoted as Rx), which may include other EDs 110 (such as other vehicles, UEs, IoT devices, surrounding sensors, etc.) and/or the BS 170.

Optionally at 902, the Tx requests resource allocation (e.g., time-frequency resources) from the BS 170 (e.g., a gNB). The step for request resource allocation may be realized by, for example, sending a scheduling request (SR) to the BS. At 904, scheduled resources are allocated at the BS 170 and signaled to the Tx. Optionally, if the scheduled transmission to be performed by the Tx (at 906 below) will include retransmission(s), the schedule signaling may also provide to the Tx (e.g., in a configuration signal or control signal, such as RRC signal or DCI transmission) information about the parameter(s) for generating vertical check block(s). The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously.

Optionally, at 905, if the scheduled transmission will include transmission of vertical check block(s), the Tx may provide to the Rx (e.g., in a configuration signal or control signal, such as PC5-RRC signal or SCI transmission) with information about the parameter(s) for generating vertical check block(s). Information about how the vertical check block(s) are generated will enable each Rx to use the vertical check block(s) to help decode the information CBs. The configuration indicated to the Rx may be the configuration that was indicated to the Tx by the BS 170 previously. The configuration or control signal may be transmitted during, together with, or following transmission of the vertical check block(s) to the Rx. For example, step 905 may take place during step 906.

At 906, the Tx performs an initial transmission (e.g., in a V2X groupcast) to multiple Rx. In some examples, the Tx may transmit only the initial transmission of data at 906, and may require further resource allocation from the BS 170 for any retransmission related to the same data. In other examples, the Tx may be allocated resources for a predetermined number of transmissions and retransmissions (each retransmission being a set of one or more vertical check blocks).

At 908, the Tx determines whether any Rx failed to successfully receive the transmission.

For example, the Tx may determine whether any Rx failed to successfully receive the transmission based on ACK/NACK feedback from the Rx. In some examples, such as where the Rx may be not all fully known to the Tx, each Rx may only send NACK if the transmission was unsuccessfully received. At 910, the Tx reports the NACK feedback to the BS 170 if any NACK was received from any Rx. Otherwise, the Tx reports ACK if the Tx does not receive any NACK feedback.

In another example, the Rx may be all known to the Tx. For example, each Rx may have dedicated PSFCH resource, and each Rx sends ACK/NACK feedback over the respective dedicated PSFCH resource. In this case, at 910 the Tx reports ACK back to the BS 170 if ACK feedback are received from all Rx, and the Tx reports NACK to the BS 170 if at least one NACK is received from a Rx.

If the Tx at 906 performs a predetermined number of retransmissions (in addition to the initial transmission), at 908 the Tx may determine whether, even after the predetermined number of retransmissions, there is still at least one Rx with failed reception (e.g., still receive at least one NACK feedback), and at 910 reports the feedback to the BS 170 accordingly.

If reception is successful at all Rx (e.g., no NACK received from any Rx, or ACK received from all Rx), then at 910 the Tx reports ACK to the BS 170 and the method 900 ends.

If the Tx reports NACK to the BS 170 at 910, the report of NACK may be interpreted by the BS 170 as a request for further resource allocation. After the BS 170 receives a NACK report from the Tx, at 912 the BS 170 schedules and signals further resource allocation to enable the Tx to perform a predetermined number of retransmissions. The Tx may be scheduled to perform one or more retransmissions, and each retransmission may independently be transmission of one or more vertical check blocks. Optionally, the schedule signaling may also provide to the Tx (e.g., in a configuration signal or control signal, such as RRC signal or DCI transmission) information about the parameter(s) for generating the vertical check block(s). The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously.

Optionally, at 913, the Tx may provide to the Rx (e.g., in a configuration signal or control signal, such as PC5-RRC signal or SCI transmission) with information about the parameter(s) for generating vertical check block(s). Information about how the vertical check block(s) are generated will enable each Rx to use the vertical check block(s) to help decode the information CBs. The configuration indicated to the Rx may be the configuration that was optionally indicated to the Tx by the BS 170 at 912. The configuration or control signal may be transmitted during, together with, or following transmission of the vertical check block(s) to the Rx. For example, step 913 may take place during step 914.

At 914, the Tx performs one or more retransmissions (up to the predetermined number of retransmissions permitted by the allocated resources). The retransmission(s) may be transmitted to all Rx (e.g., if Rx are not all fully known to the Tx), or only to those Rx having failed reception (e.g., if Rx are all known to the Tx).

Figure 9B:
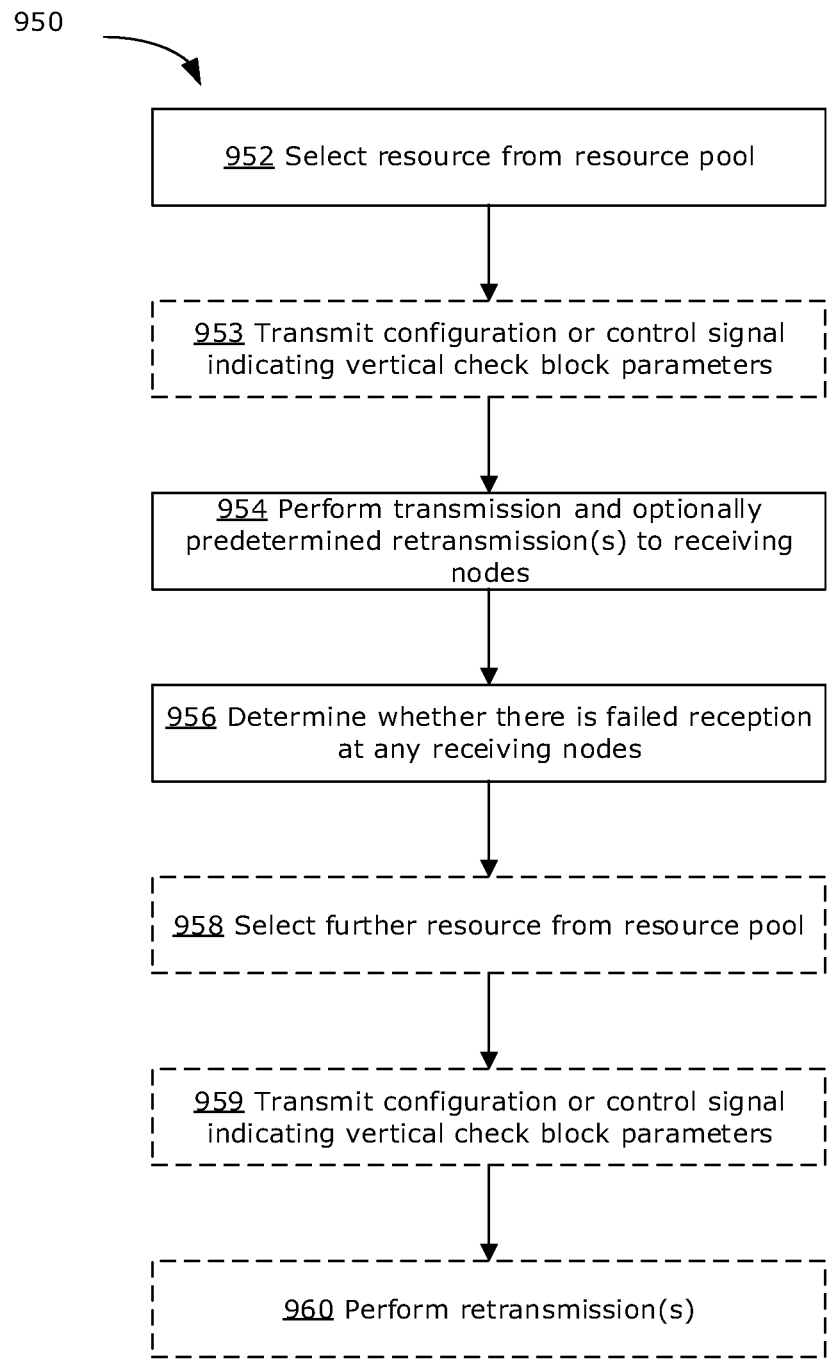

FIG. 9B is a flowchart illustrating an example method 950 that may be performed by the transmitting node, for multicast or groupcast communications using mode 2 as defined in NR-V2X. The transmitting node may be a network-enabled vehicle, or more generally denoted as Tx. The multicast or groupcast communications is to multiple receiving nodes (generally denoted as Rx), which may include other EDs 110 (such as other vehicles, UEs, IoT devices, surrounding sensors, etc.) and/or the BS 170.

At 952, the Tx selects the necessary resource (e.g., time-frequency resources) the resource pool. The resource pool may be preconfigured or configured in advance by the network. The BS 170 is not involved in allocating ED-specific resources to the Tx for each transmission. The Tx selects resources according to the predetermined number of transmission/retransmission(s).

Optionally, at 953, if the transmission will include transmission of vertical check block(s), the Tx may provide to the Rx (e.g., in a configuration signal or control signal, such as PC5-RRC signal or SCI transmission) with information about the parameter(s) for generating vertical check block(s). Information about how the vertical check block(s) are generated will enable each Rx to use the vertical check block(s) to help decode the information CBs. The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously. The configuration or control signal may be transmitted during, together with, or following transmission of the vertical check block(s) to the Rx. For example, step 905 may take place during step 906.

At 954, the Tx performs an initial transmission (e.g., in a V2X groupcast) to multiple Rx. Similar to FIG. 9A, in some examples, the Tx may transmit only the initial transmission at 954, and may require further resources for any retransmission. In other examples, the Tx may have selected resources for a predetermined number of retransmissions (each retransmission being a set of one or more vertical check blocks).

At 956, the Tx determines whether any Rx failed to successfully receive the transmission.

For example, the Tx may determine whether any Rx failed to successfully receive the transmission based on ACK/NACK feedback from the Rx. In some examples, such as where the Rx may be not all fully known to the Tx, each Rx may only send NACK if the transmission was unsuccessfully received. The Tx determines there is failed reception if any NACK was received from any Rx. Otherwise, the Tx determines that the transmission was successfully received by all Rx.

In another example, the Rx may be known to the Tx. For example, each Rx may have dedicated PSFCH resource, and each Rx sends ACK/NACK feedback over the respective dedicated PSFCH resource. In this case, the Tx determines there is failed reception if any NACK was received from any Rx, or the Tx determines that the transmission was successfully if ACK feedback are received from all Rx.

If the Tx at 954 performs a predetermined number of retransmissions (in addition to the initial transmission), at 956 the Tx may determine whether, even after the predetermined number of retransmissions, there is still at least one Rx with failed reception (e.g., still receive at least one NACK feedback).

If reception is successful at all Rx (e.g., no NACK received from any Rx, or ACK received from all Rx), then at 956 the Tx determines there is no failed reception at any Rx and the method 950 ends.

If it is determined at 956 that there is at least one Rx with failed reception, then at 958 the Tx selects further resources from the resource pool for performing one or more retransmissions. The number of retransmissions to perform, and the number of vertical check block(s) to send in each retransmission may be preconfigured at the Tx.

Optionally, at 959, the Tx may provide to the Rx (e.g., in a configuration signal or control signal, such as PC5-RRC signal or SCI transmission) with information about the parameter(s) for generating vertical check block(s). Information about how the vertical check block(s) are generated will enable each Rx to use the vertical check block(s) to help decode the information CBs. The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously. The configuration or control signal may be transmitted during, together with, or following transmission of the vertical check block(s) to the Rx. For example, step 959 may take place during step 960.

At 960, the Tx performs one or more retransmissions (up to the predetermined number of retransmission permitted by the selected resources). The retransmission(s) may be transmitted to all Rx (e.g., if Rx are not all fully known to the Tx), or only to those Rx having failed reception (e.g., if Rx are all known to the Tx).

It may be noted that, for broadcast transmissions, in some examples only blind retransmission (i.e., ACK/NACKless retransmission) may be supported. In blind retransmission, the Tx transmits the initial transmission and a predetermined number of retransmissions (each retransmission being a respective set of one or more vertical check blocks). For blind retransmission, the Tx may be allocated resources by the BS 170 (in mode 1) or may select resources from the resource pool (in mode 2) sufficient for the initial transmission and the predetermined number of retransmissions.

The present disclosure also describes examples in which vertical check blocks are generated from multiple TBs or packets. It should be understood that the following discussion, which refers to packets in some instances, may also be applicable to TBs. Such vertical check blocks may be referred to as cross-packet check blocks.

Figure 10A:
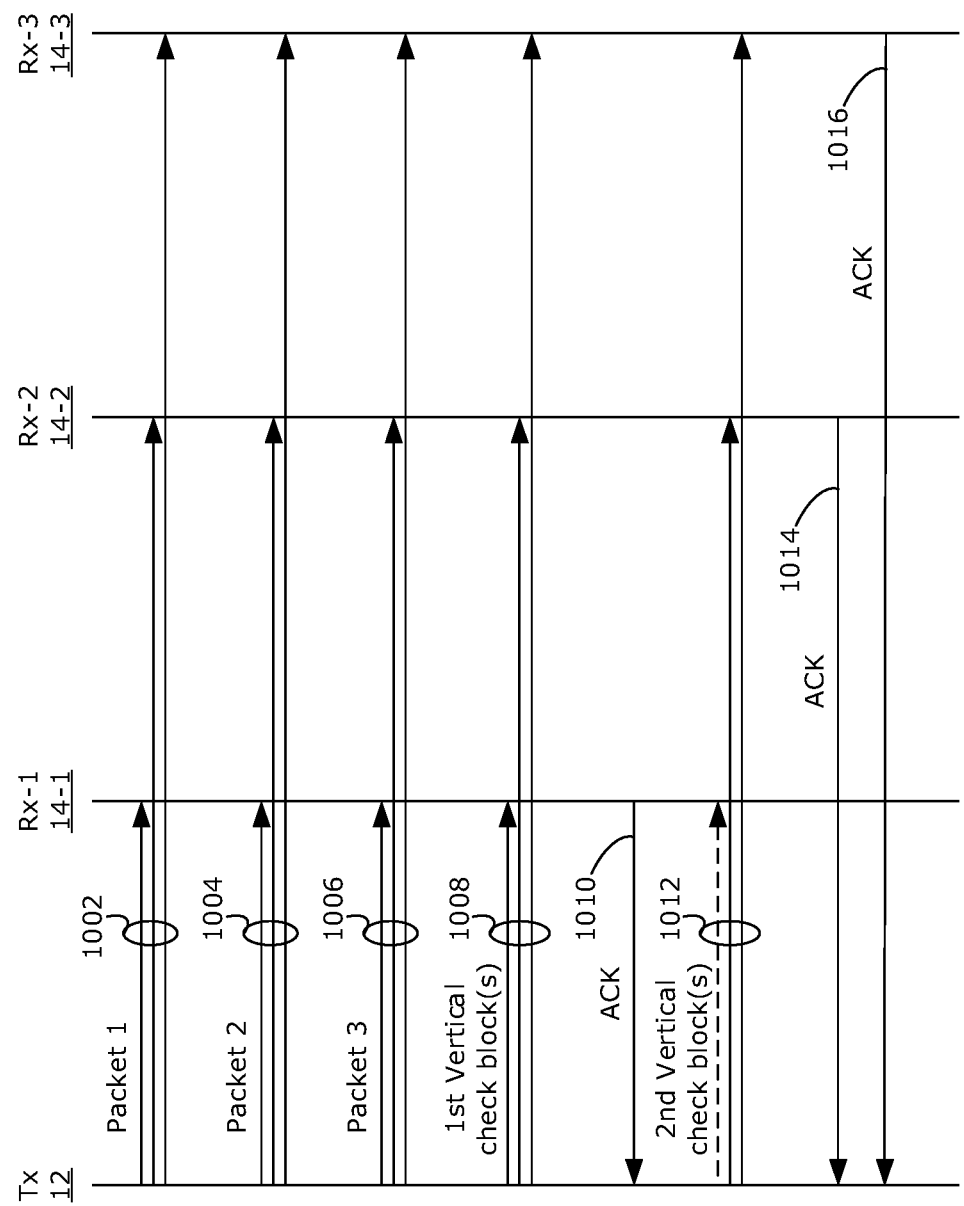
FIGS. 10A and 10B are signaling diagrams illustrating examples of using cross-packet vertical check blocks for broadcast, multicast or groupcast transmissions.

FIG. 10A is a signaling diagram illustrating an example of using cross-packet vertical check blocks in multicast, groupcast or broadcast transmissions. The transmitting node 12 (denoted as Tx 12) and receiving nodes 14 (denoted as Rx-1 14-1, Rx-2 14-2 and Rx-3 14-3, generally referred to as Rx 14) may be similar to those of FIGS. 8A and 8B. Although not shown, the Tx 12 may transmit a configuration signal or control signal to the Rx 14 (e.g., prior to the initial transmission, prior to a retransmission, during a retransmission, together with a retransmission or immediately following a retransmission) to provide information about the parameters used for generating the vertical check blocks. Such information may be necessary for the Rx 14 to make use of the vertical check blocks to help in decoding.

As shown in FIG. 10A, the Tx 12 transmits multiple TBs to the Rx 14. Each TB is transmitted in a respective packet (in this example, packet 1, packet 2 and packet 3 at 1002, 1004 and 1006, respectively). Each TB contains one or more CBs, and each TB may have a different number of CBs. Each transmission at 1002, 1004, 1006 may be referred to as an initial transmission of the respective packet (i.e., initial transmission of packet 1 at 1002, initial transmission of packet 2 at 1004, and initial transmission of packet 3 at 1006).

Similar to FIGS. 8A-8E, the retransmission scheme may be feedback-based (in which ACK/NACK feedback from each Rx 14 is required) or ACK/NACKless (in which ACK/NACK feedback is optional or omitted). If feedback is transmitted, each Rx 14 may provide feedback after attempting to decode each packet (i.e., after each transmission at 1002, 1004, 1006), or after attempting to decode all packets (i.e., after the last transmission at 1006). The Tx may, in a configuration signal or control signal, inform the Rx 14 how many packets to expect and/or how many transmissions to expect before providing feedback.

In the example of FIG. 10A, the Tx 12 does not receive any feedback after the transmission of the last packet at 1006. The Tx 12 determines that there is at least one Rx 14 that failed to decode at least one of the three packets. For example, as shown in FIG. 10D, the Tx 12 transmits CB1 and CB2 in packet 1 at 1002, CB3 and CB4 in packet 2 at 1004, and CB5 and CB6 in packet 3 at 1006. Rx-1 14-1 fails to decode CB5 (indicated by crossed-out CB5), Rx-2 14-2 fails to decode CB2 and CB5 (indicated by crossed-out CB2 and CB5), and RX-3 14-3 fails to decode CB1, CB2 and CB5 (indicated by crossed-out CB1, CB2 and CB5). Notably, each Rx 14 may fail to decode a different packet. The Tx 12 generates one or more vertical check blocks using CBs from multiple packets. For example, the vertical check block(s) may be generated by taking cross-block bits from all CBs across all of packets 1-3, as indicated by arrow 1018 in FIG. 10D.

As shown in FIGS. 10A and 10D, at 1008, the Tx 12 transmits the vertical check block(s) to the Rx 14. The Tx 12 may continue to generate and transmit cross-packet vertical check blocks until ACK is received from all Rx 14. In this example, only Rx-1 14-1 successfully decodes all three packets following the first retransmission at 1008 and transmits ACK at 1010 to the Tx 12. Because Rx-2 14-2 and Rx-3 14-3 did not transmit ACK, the Tx 12 performs a second retransmission. In some examples, the Tx 12 may generate additional vertical check block(s) using CBs from all the packets for the second retransmission. In other examples, the vertical check blocks used for the first and second retransmissions may have been generated together but sent in separate retransmissions. The second retransmission using the additional vertical check block(s) is performed at 1012 (optionally, Rx-1 14-1 may be excluded from the second retransmission). The vertical check block(s) transmitted at 1012 may have been generated by taking cross-block bits from all CBs across all of packets 1-3. In this examples, both Rx-2 14-2 and Rx-3 14-3 successfully decode all three packets following the second retransmission, and send back ACK to the Tx 12 at 1014 and 1016, respectively. The Tx 12 then stops the retransmission. In some examples, the Tx 12 performs up to a maximum predetermined number of retransmissions.

Figure 10B:
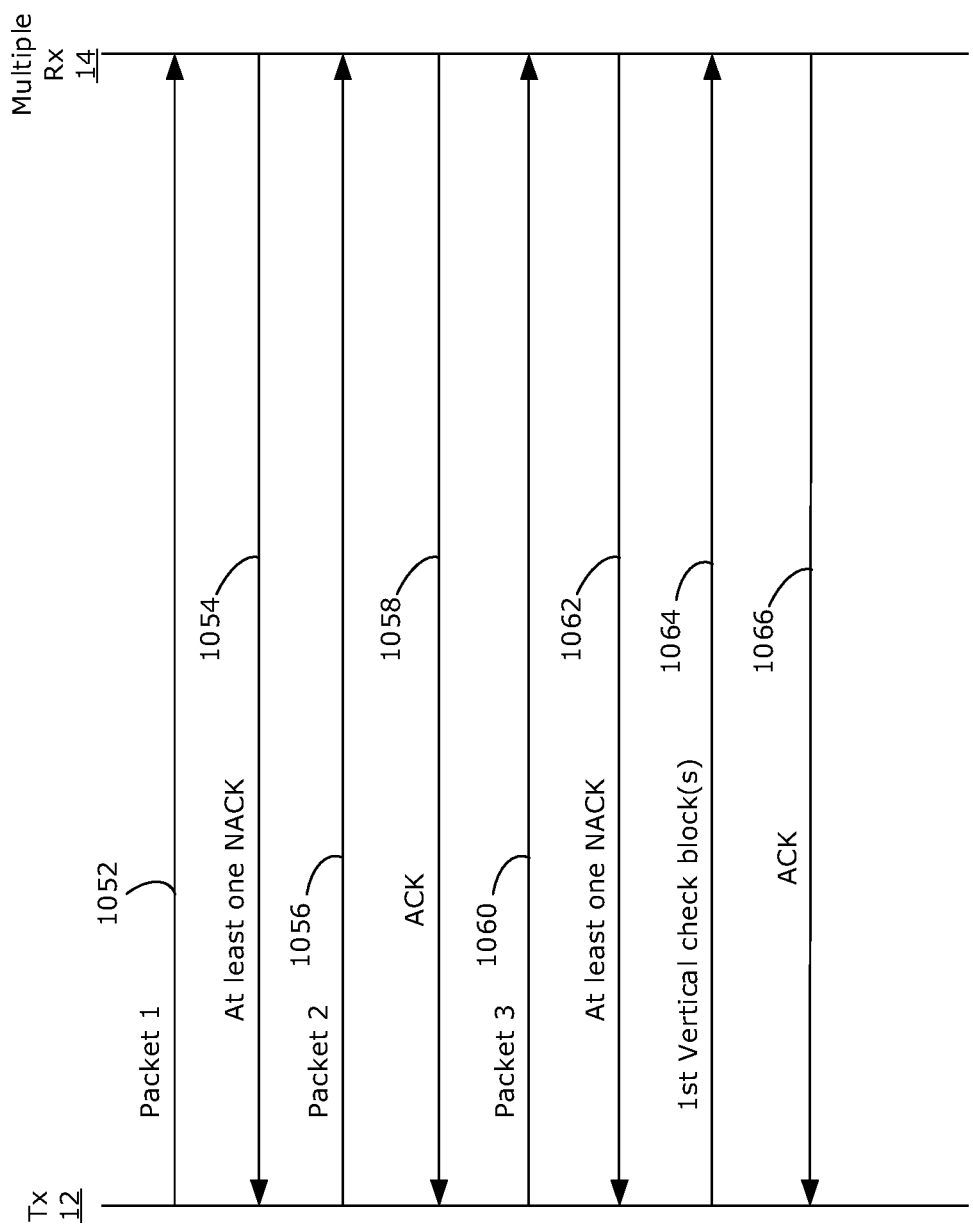

FIG. 10B is a signaling diagram illustrating another example of using cross-packet vertical check blocks in multicast, groupcast or broadcast transmissions. FIG. 10E illustrates the packets transmitted in the example of FIG. 10B, from the Tx 12 to each of Rx-1 14-1, Rx-2 14-2 and Rx-3 14-3 (generally referred to as Rx 14). Although not shown, the Tx 12 may transmit a configuration signal or control signal to the Rx 14 (e.g., prior to the initial transmission, prior to a retransmission, during a retransmission, together with a retransmission, or immediately following a retransmission) to provide information about the parameters used for generating the vertical check blocks. Such information may be necessary for the Rx 14 to make use of the vertical check blocks to help in decoding.

In FIGS. 10B and 10E, the Rx 14 may provide feedback following each transmission of a packet. For example, following the transmission of packet 1 at 1052, at least one Rx 14 may transmit at least one NACK to the Tx 12 at 1054 to indicate failure to decode packet 1. For example, in FIG. 10E, Rx-2 14-2 and Rx-3 14-3 fail to decode all CBs in packet 1 and transmit back NACK, while Rx-1 14-1 successfully decodes packet 1 and transmits back ACK. Alternatively, instead of transmitting NACK, the Rx 14 that failed to decode packet 1 may fail to transmit ACK. The Tx 12 uses this feedback (either receipt of NACK from at least one Rx or not receiving ACK from all Rx) to determine that there is at least one Rx 14 that failed to decode packet 1.

The Tx 12 may wait to send a retransmission until after all three intended packets have been initially transmitted. At 1056, the Tx 12 transmits packet 2 to all the Rx 14. In this case, the Rx 14 receives ACK from all Rx 14 at 1058, indicating that all Rx 14 successfully received and decoded packet 2.

At 1060, the Tx 12 transmits packet 3 to all the Rx 14. At least one Rx 14 may transmit at least one NACK to the Tx 12 at 1062 to indicate failure to decode packet 3. For example, in FIG. 10E, all Rx 14 fail to decode all CBs in packet 3 and transmit back NACK (each Rx 14 may fail to decode different CBs of packet 3). Alternatively, instead of transmitting NACK, the Rx 14 that failed to decode packet 3 may fail to transmit ACK. The Tx 12 uses this feedback (either receipt of NACK from at least one Rx or not receiving ACK from all Rx) to determine that there is at least one Rx 14 that failed to decode packet 3.

The Tx 12 generates one or more cross-packet vertical check blocks from only the CBs belonging to the packet(s) that were not successfully decoded by all Rx 14. In this example, the Tx 12 generates the vertical check block(s) from the CBs of packet 1 and packet 3, but not packet 2 (which was successfully decoded by all Rx 14) (as indicated by arrow 1063 in FIG. 10E). The vertical check block(s) are transmitted in the retransmission at 1064. In the configuration or control signaling sent from the Tx 12 to the Rx 14, the Tx 12 may indicate that the vertical check block(s) transmitted at 1064 are generated using CBs from packet 1 and packet 3, so that the Rx 14 can use this information to correctly using the received vertical check block(s) to help decode CBs from packet 1 and packet 3. In this example, the Tx 12 receives ACK from all Rx 14 at 1066, indicating that all Rx 14 have now successfully decoded all three packets. The Tx 12 then stops the retransmission. In some examples, the Tx 12 performs up to a maximum predetermined number of retransmissions.

In the examples of FIGS. 10A and 10B, vertical check blocks are generated from CBs belonging to multiple TBs (rather than from a single TB). This may help to further improve the efficiency of the retransmission. Information from a single retransmission can be useful to help decode CBs from different TBs. In some examples (e.g., in the example of FIG. 10B), the CBs used to generate a set of vertical check block(s) may be selected from only those TBs that were not successfully decoded (based on feedback from the multiple Rx), which may further help to improve efficiency.

Figure 10C:
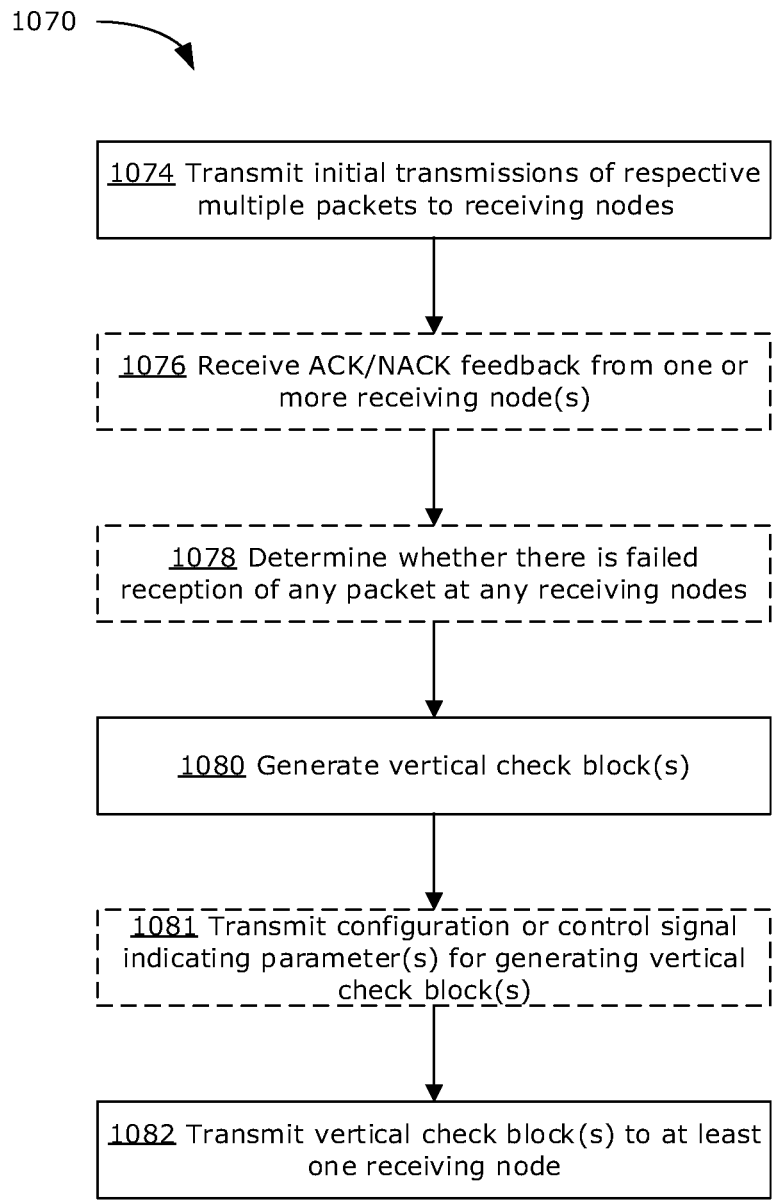
FIG. 10C is a flowchart illustrating an example method that may be performed by a transmitting node, in accordance with FIGS. 10A and 10B.
Figure 10D:
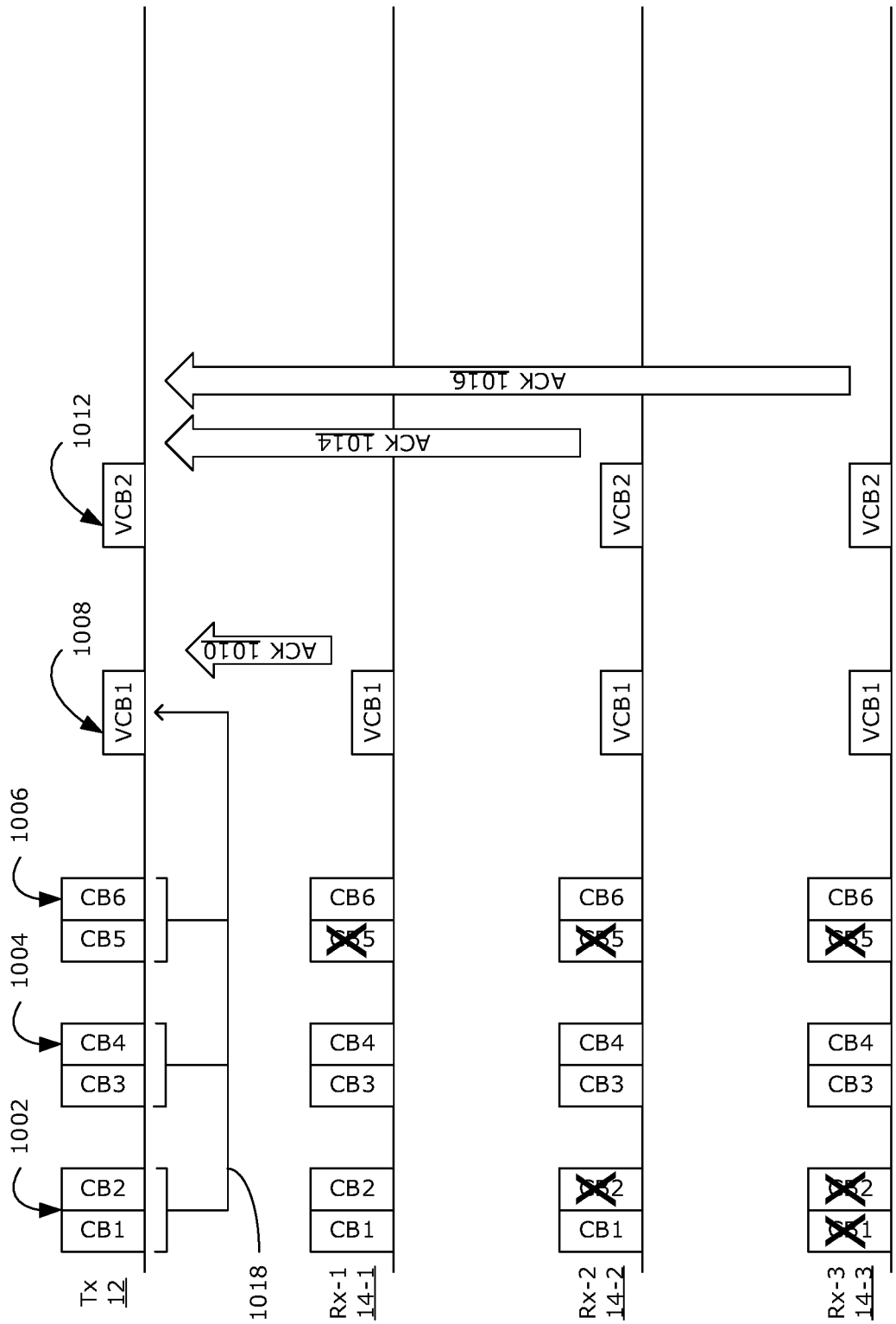
FIGS. 10D and 10E illustrate examples of the code blocks transmitted in the examples of FIGS. 10A and 10B.
Figure 10E:
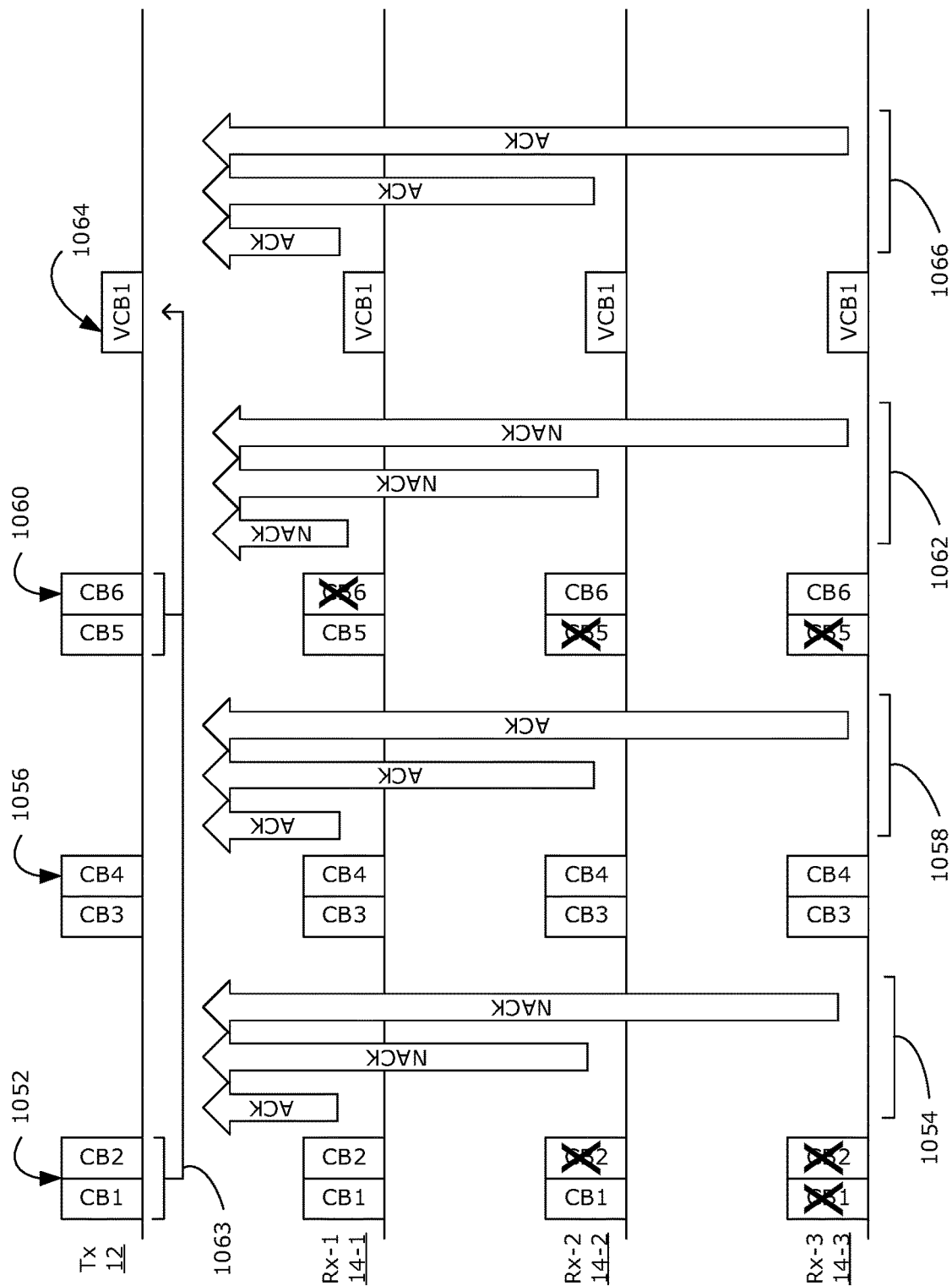

FIG. 10C is a flowchart illustrating an example method 1070 that may be performed by the transmitting node, in accordance with the signaling examples of FIGS. 10A and 10B.

At 1074, the Tx 12 transmits multiple initial transmissions of respective multiple packets (each initial transmission being a communication of a respective different packet) to multiple intended Rx 14 (e.g., at signals 1002-1006 FIG. 10A; or at signals 1052, 1056, 1060 of FIG. 10B). The initial transmissions may each be a broadcast, groupcast or multicast transmission. Each packet communicated in a respective initial transmission contains one or more information CBs.

Optionally, at 1076, feedback may be received from one or more Rx 14. For example, in a feedback-based retransmission scheme, each Rx 14 may be required to send back ACK/NACK feedback to the Tx 12 following each initial transmission or following an expected number of initial transmissions (e.g., if the Rx 14 knows the expected number of initial transmissions from a configuration signal or control signal). In an ACK/NACKless retransmission scheme, ACK feedback may be optional and there may be no NACK feedback.

Optionally, at 1078, the Tx 12 determines whether there is failed reception of at least one packet by at least one Rx 14. Failed reception at one Rx 14 means that the Rx 14 was unable to successfully decode the information CBs of at least one packet. In the case of a feedback-based retransmission scheme, the Tx 12 can determine that at least one Rx 14 failed to successfully decode at least one packet if at least one NACK is received at step 1076. In the case of an ACK/NACKless retransmission scheme, the Tx 12 can determine that at least one Rx 14 failed to successfully decode the packets if the Tx 12 does not receive ACK from all intended Rx 14. In some examples, if feedback is received after transmission of each packet, the Tx 12 may also determine which packet(s) were unsuccessfully decoded by at least one Rx 14 (it should be noted that different Rx 14 may fail to decode different packets). Depending on the feedback received at step 1076, the Tx 12 may also identify which Rx 14 experienced the failed reception.

In some examples, such as in a broadcast scenario, the Tx 12 may not receive any feedback from any Rx 14, and instead the Tx 12 may perform an initial transmission and a predetermined number of retransmissions (also referred to as a blind retransmission scheme). In such cases, step 1076 may be omitted.

At 1080, the Tx 12 generates one or more vertical check blocks. The vertical check block(s) are generated using bits selected from the CBs of at least two of the packets that were transmitted in the initial transmission at step 1074. Information bits belonging to least one CB from each of the at least two packets are selected for generating the vertical check block(s). In examples where the Tx 12 received feedback (at optional step 1076) indicating particular packets that were not successfully decoded, the vertical check block(s) may be generated using only bits from those particular packets. The generation of the vertical check block(s) may take place any time in the method 1070 prior to transmission of the vertical check block(s). For example, the vertical check block(s) may be generated prior to the initial transmissions, or following optional steps 1076 and 1078.

Optionally, at 1081, a configuration signal or control signal (e.g., RRC signal, PC5-RRC signal, DCI transmission or SCI transmission) may be transmitted by the Tx 12 to provide the Rx 14 with the parameter(s) for generating vertical check block(s). Information about how the vertical check block(s) are generated will enable each Rx 14 to use the vertical check block(s) (which will be transmitted in a retransmission) to help decode the information CBs. The configuration signal or control signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously. The configuration information may also indicate which packets were used to generate the vertical check block(s). The configuration information may be received prior to or at the start of the method 1070, or any time during the method 1070 including during, together with, or following transmission of the vertical check block(s) to the Rx 14. For example, step 1081 may take place during step 1082.

In some examples, a configuration signal or control signal may not need to be transmitted and step 1081 may be omitted. For example, the parameters for generating vertical check block(s) may be predetermined (e.g., defined in a standard) and does not need to be communicated from the Tx 12 to each Rx 14.

At 1082, at least one vertical check block is transmitted to at least one Rx 14. The vertical check block(s) may be transmitted to multiple Rx 14 (e.g., in a broadcast, multicast or groupcast, similar to the initial transmissions). In some examples, the vertical check block(s) may be transmitted in a broadcast, multicast or groupcast to all Rx 14 regardless of whether a given Rx 14 successfully or unsuccessfully decoded the initial transmission. In other examples, the vertical check block(s) may be transmitted in a multicast or groupcast only to those Rx 14 that were determined (at optional step 1078) to have failed to successfully decode the initial transmission.

Further steps of optionally receiving feedback and transmitting subsequent retransmission(s) may be performed as appropriate (e.g., up to a predetermined number of retransmissions).

In the examples described above, the transmitting node transmits the information CBs in an initial transmission, and the vertical check block(s) in a subsequent retransmission. However, it should be understood that in any of the examples discussed herein, at least one vertical check block may be transmitted together with the information CBs in the initial transmission.

The signaling that is performed is similar to that of FIGS. 8A, 8B, 10A and 10B described previously, with the difference that the initial transmission includes at least one vertical check block together with the information CBs. The transmitting node generates the vertical check block(s) from the CBs prior to the initial transmission, and includes the vertical check block(s) in the initial transmission. The transmitting node may, prior to the initial transmission, transmit a configuration signal or control signal to indicate to the receiving nodes that vertical check block(s) are included in the initial transmission. Subsequent retransmission(s) of additional vertical check block(s) may be performed as necessary (e.g., according to a predetermined number of retransmissions, or based on feedback from receiving nodes), similar to that described previously.

In this example, because at least one vertical check block is transmitted with the initial transmission, the generation and transmission of the vertical check block(s) is performed by the transmitting node without any feedback from any of the receiving nodes. Accordingly, in some examples, the generation of the vertical check block(s) may be performed according to predetermined parameters (e.g., the number of vertical check blocks to generate, the selection of bits for generating the vertical check block(s), etc.).

In some examples, the number of vertical check block(s) to include with information CBs in the initial transmission may be determined by the transmitting node based on channel characteristics. The transmitting node may characterize the transmission channels for all intended receiving nodes (e.g., using channel feedback from the receiving nodes) to determine a code rate of the vertical check blocks for the initial transmission. The code rate can be determined based on a trade-off between increased overhead (due to the addition of vertical check block(s) in the initial transmission) and likelihood of any receiving being able to fully decode the information CBs (due to poor channel quality).

For example, the code rate in the initial transmission may be determined based on channel state information feedback (e.g., SNR of each receiving node). For example, if the receiving node with the worst channel quality has an SNR below a certain threshold, then a given number of vertical check blocks may be sent in the initial transmission. The threshold and the corresponding number of vertical check blocks may be determined, for example, based on achieving a minimum probability of all receiving nodes successfully decoding the packet after initial transmission. For example, there may be multiple predefined SNR thresholds, and a corresponding number of vertical check blocks may be predefined for each SNR threshold. This information may be predefined in a standard, for example. In some examples, instead of using the receiving node with the worst channel quality as the criteria for determining the code rate, the average channel quality of all receiving nodes, a channel quality based on a certain percentage of receiving nodes or other statistic value of the receiving nodes' channel quality may be used. For example, if it is known that one or more receiving nodes have poor channel quality (and is therefore likely to need redundant information to help decode the CBs), it would be more efficient to include vertical check block(s) in the initial transmission instead of waiting for NACK from those receiving nodes.

The initial transmission, which includes the CBs as well as the vertical check block(s) may then be multicast, groupcast or broadcast to the intended receiving nodes (e.g., similar to fountain code for MBMS).

If additional vertical check block(s) is needed after the initial transmission, then the additional vertical check block(s) may be generated using different interleavers or RVs than that used for the vertical check block(s) that were included with the initial transmission.

Figure 11A:
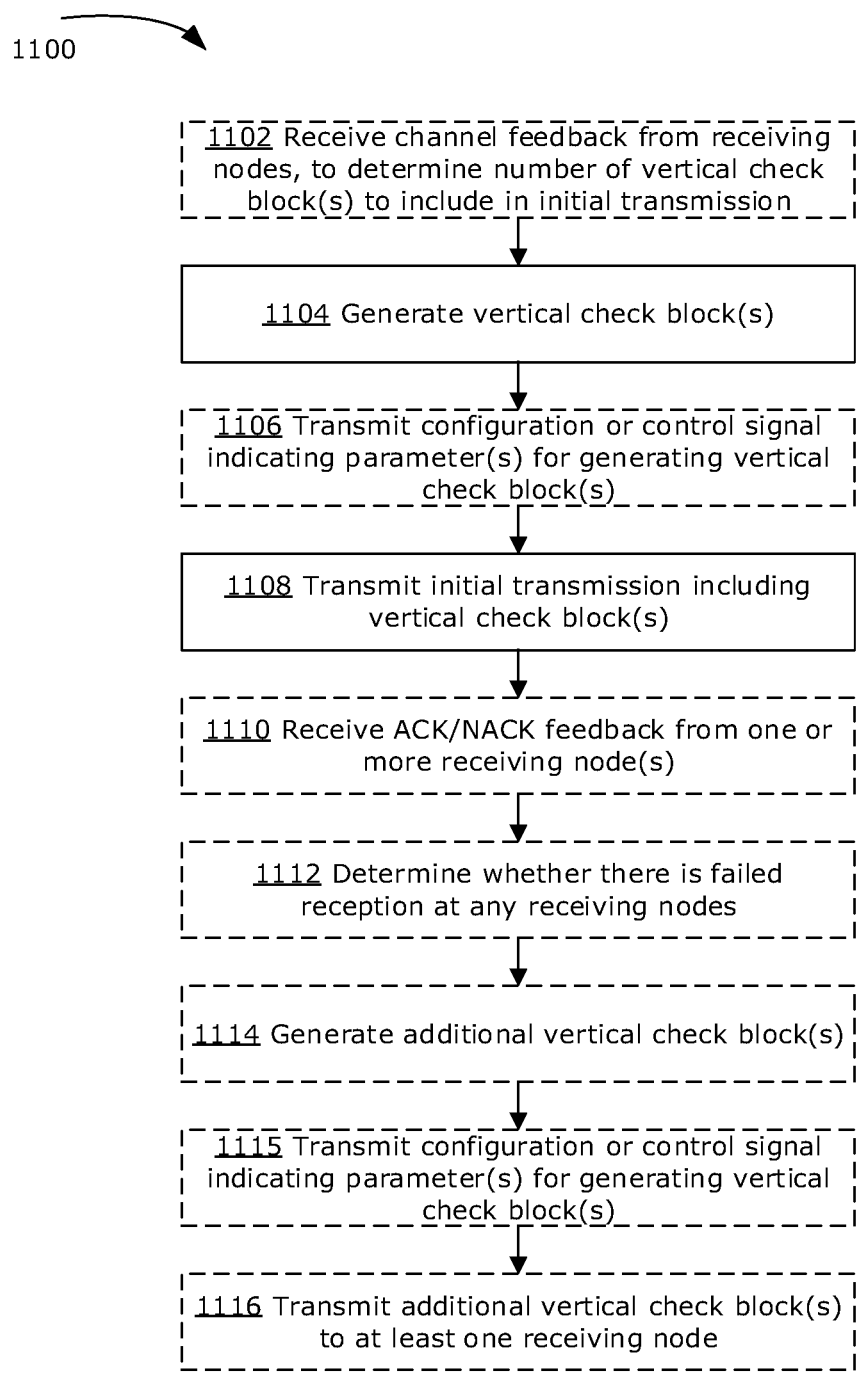
FIG. 11A is a flowchart illustrating an example method that may be performed by a transmitting node, for including vertical check block(s) in an initial transmission.
Figure 11B:
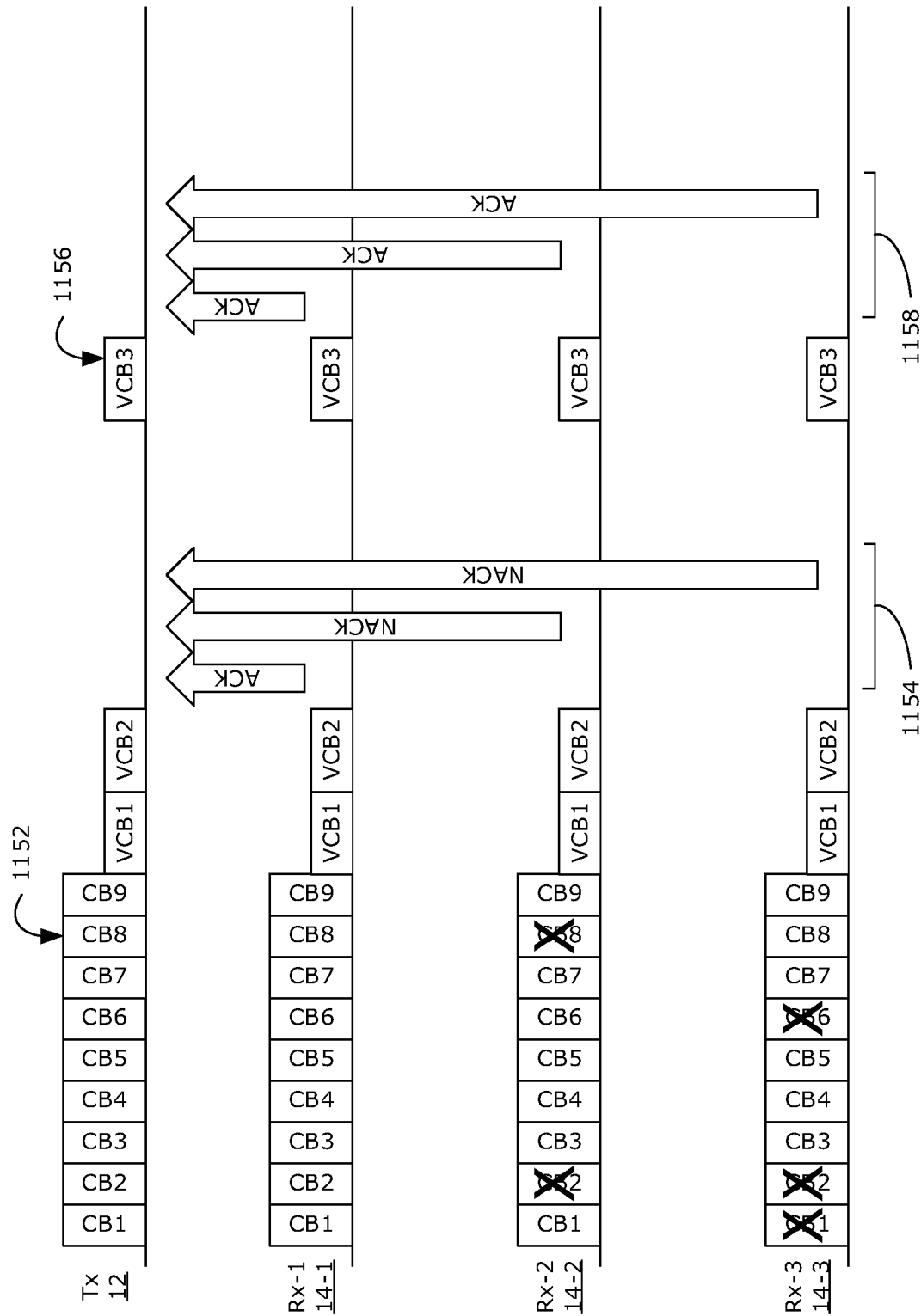
FIG. 11B illustrate an example of the code blocks transmitted in the example of FIG. 11A.

FIG. 11A is a flowchart illustrating an example method 1100 that may be performed by the transmitting node, in which vertical check block(s) are included in the initial transmission. FIG. 11B illustrates example transmissions by the Tx 12 to Rx-1 14-1, Rx-2 14-2 and Rx-3 14-3 (generally referred to as Rx 14).

Optionally, at 1102, the transmitting node receives channel feedback from the intended receiving nodes. Using this channel feedback information, the transmitted node may determine the code rate and hence the number of vertical check blocks that should be included in the initial transmission. In some cases, the code rate and/or the number of vertical check blocks to include in the initial transmission may be predetermined (e.g., according to a standard, or preconfigured) and step 1102 may be omitted. It should be noted that step 1102 may determine that the number of vertical check blocks to include in the initial transmission is zero.

At 1104, the Tx 12 generates one or more vertical check blocks. The vertical check block(s) are generated using bits selected from at least two of the information CBs to be transmitted in the initial transmission.

Optionally, at 1106, a configuration signal or control signal (e.g., RRC signal, PC5-RRC signal, DCI transmission or SCI transmission) may be transmitted by the Tx 12 to provide the Rx 14 with the parameter(s) for generating vertical check block(s). Information about how the vertical check block(s) are generated will enable each Rx 14 to use the vertical check block(s) (which will be transmitted in a retransmission) to help decode the information CBs in the initial transmission. The configuration signal or control signal may be used to indicate NDI, HARQ process ID, number of repetitions, number of vertical check block(s)

transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously. The configuration information may be received prior to or at the start of the method 1100, or any time during the method 1100 including during, together with, or following transmission of the vertical check block(s) to the Rx 14. For example, step 1106 may take place during step 1108. The configuration information may include an indication of whether and how many vertical check blocks are included with the information CBs in the initial transmission.

In some examples, a configuration signal or control signal may not need to be transmitted and step 1106 may be omitted. For example, the parameters for generating and transmitting vertical check block(s) may be predetermined (e.g., defined in a standard) and does not need to be communicated from the Tx 12 to each Rx 14.

At 1108, the Tx 12 transmits an initial transmission to multiple intended Rx 14. The initial transmission includes the information CBs and at least one vertical check block. The initial transmission may be a broadcast, groupcast or multicast transmission. In the example of FIG. 11B, the initial transmission at 1152 includes CBs 1-9 and two vertical check blocks (VCB1 and VCB2).

Optionally, at 1110, feedback may be received from one or more Rx 14. For example, in a feedback-based retransmission scheme, each Rx 14 may be required to send back ACK/NACK feedback to the Tx 12. In an ACK/NACKless retransmission scheme, ACK feedback may be optional and there may be no NACK feedback. In the example of FIG. 11B, Rx-2 14-2 and Rx-3 14-3 each fails to decode at least one information CB (Rx-2 14-2 and Rx-3 14-3 may fail to decode different CBs) and transmit back NACK at 1154, while Rx-1 14-1 successfully decodes all CBs and transmits back ACK at 1154.

Optionally, at 1112, the Tx 12 determines whether there is failed reception by at least one Rx 14. Failed reception at one Rx 14 means that the Rx 14 was unable to successfully decode the information CBs. In the case of a feedback-based retransmission scheme, the Tx 12 can determine that at least one Rx 14 failed to successfully decode the CBs if at least one NACK is received at step 1110. In the case of an ACK/NACKless retransmission scheme, the Tx 12 can determine that at least one Rx 14 failed to successfully decode the CBs if the Tx 12 does not receive ACK from all intended Rx 14. Depending on the feedback received at step 1110, the Tx 12 may also identify which Rx 14 experienced the failed reception.

In some examples, such as in a broadcast scenario, the Tx 12 may not receive any feedback from any Rx 14, and instead the Tx 12 may perform a predetermined number of retransmissions (also referred to as a blind retransmission scheme). In such cases, steps 1110 and 1112 may be omitted.

Optionally, at 1114, the Tx 12 generates additional one or more vertical check blocks. Step 1114 may be performed based on a determined that there was failed reception by at least one Rx 14 at optional step 1112. Alternatively, step 1114 may be performed in a blind retransmission scheme, as part of a predetermined number of retransmissions. The additional vertical check block(s) may be generated using a different interleaver than that used to generate the vertical check block(s) at step 1106. Additional configuration or control signals may be transmitted to the Rx 14 to indicate the parameters used to generate the additional vertical check block(s).

Optionally, at 1115, a configuration signal or control signal (e.g., RRC signal, PC5-RRC signal, DCI transmission or SCI transmission) may be transmitted by the Tx 12 to provide the Rx 14 with the parameter(s) for generating the additional vertical check block(s), similar to step 1106 above. For example, step 1115 may take place during step 1116.

In some examples, a configuration signal or control signal for the additional vertical check block(s) may not need to be transmitted and step 1115 may be omitted. For example, the parameters for generating vertical check block(s) may be predetermined (e.g., defined in a standard) and does not need to be communicated from the Tx 12 to each Rx 14, or the parameters for generating the additional vertical check block(s) may have been already signaled at step 1106.

Optionally, at 1116, at least one additional vertical check block is transmitted to at least one Rx 14. The additional vertical check block(s) may be transmitted to multiple Rx 14 (e.g., in a broadcast, multicast or groupcast, similar to the initial transmission). In some examples, the additional vertical check block(s) may be transmitted in a broadcast, multicast or groupcast to all Rx 14 regardless of whether a given Rx 14 successfully or unsuccessfully decoded the initial transmission. In other examples, the additional vertical check block(s) may be transmitted in a multicast or groupcast only to those Rx 14 that were determined (at optional step 1112) to have failed to successfully decode the initial transmission. In the example of FIG. 11B, one additional vertical check block (VCB3) is transmitted at 1156.

In some examples, the additional vertical check block(s) transmitted at optional step 1116 may be from the vertical check blocks generated at step 1106 (in which case step 1114 may be omitted). For example, a subset of the generated vertical check block(s) may be included with the initial transmission, and the remaining vertical check block(s) may be transmitted at step 1116.

Further steps of optionally receiving feedback and transmitting subsequent retransmission(s) may be performed as appropriate (e.g., up to a predetermined number of retransmissions). In the example of FIG. 11B, ACK is received from all Rx 14 at 1158.

In the examples described above, the transmitting node that transmits the information CBs in an initial transmission is also responsible for transmitting vertical check block(s) in a retransmission. However, it should be understood that in any of the examples discussed herein, at least one vertical check block may be transmitted by another assisting transmitting node. The vertical check blocks may be generated by different transmitting nodes independently and without coordination. Thus, multiple transmitting nodes may cooperate together to implement a retransmission scheme. This may be well-suited to a blind retransmission scheme (e.g., for a rateless code), in which the assisting transmitting node does not require feedback from the receiving nodes.

Figure 12A:
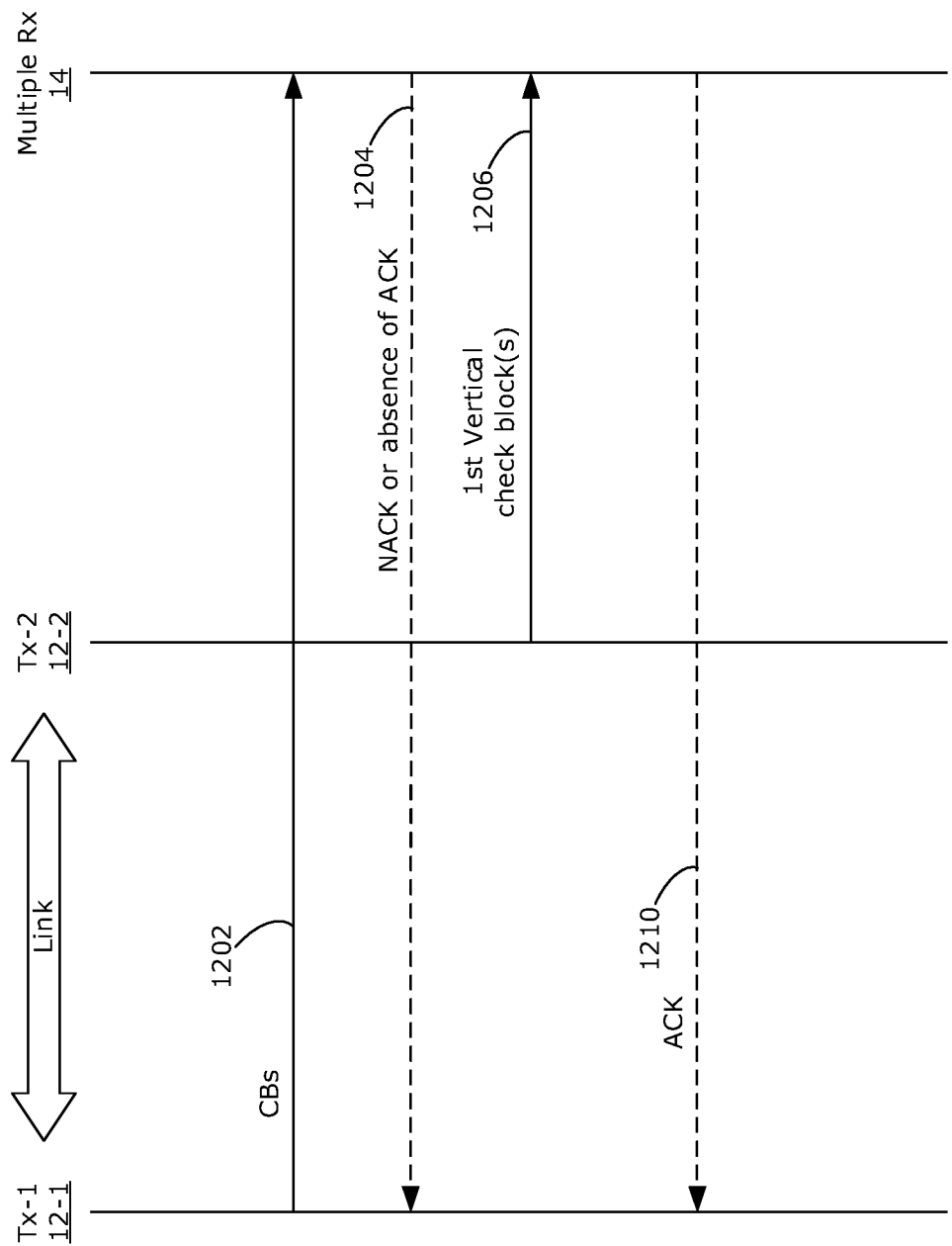
FIG. 12A is a signaling diagram illustrating an example in which multiple transmitting nodes are involved in broadcast, multicast or groupcast transmissions.

FIG. 12A is a signaling diagram illustrating an example of using two or more transmitting nodes for generating and sending vertical check blocks in multicast, groupcast or broadcast transmissions. In this example, there are two transmitting nodes (denoted as the first transmitting node Tx-1 12-1 and the second transmitting node Tx-2 12-2, generally referred to as Tx 12). For simplicity, FIG. 12A does not show each Rx 14 separately, however it should be understood that each Tx 12 is transmitting to multiple Rx 14. FIG. 12C illustrates the transmissions according to the example of FIG. 12A, where there are three Rx 14. Although not shown, one or both Tx 12 may transmit a configuration signal or control signal to the Rx 14 (e.g., prior to the initial transmission, prior to a retransmission, together with a retransmission, during a retransmission, or immediately following a retransmission) to provide information about the parameters used for generating the vertical check blocks. Such information may be necessary for the Rx 14 to make use of the vertical check blocks to help in decoding.

In the example of FIG. 12A, Tx-1 12-1 and Tx-2 12-2 may communicate with each other over a communication link. The communication link between Tx-1 12-1 and Tx-2 12-2 may be a backhaul link (e.g., in the case where Tx-1 12-1 and Tx-2 12-2 are both BSs 170) or any other wired or wireless communication link (e.g., a sidelink in the case where Tx-1 12-1 and Tx-2 12-2 are both EDs 110). In other examples, the Tx-1 12-1 and Tx-2 12-2 may communicate with each other over an inter-source link (e.g., in the case where Tx-1 12-1 and Tx-2 12-2 are different transmitting devices of the same source). In other examples, there may not be communication between Tx-1 12-1 and Tx-2 12-2 over a direct communication link, however Tx-2 12-2 has access to or is provided with the information CBs or the vertical check block(s). For example, there may be another network entity that manages and configures both Tx-1 12-1 and Tx-2 12-2 (e.g., if Tx-1 12-1 and Tx-2 12-2 are both EDs 110, both Tx-1 12-1 and Tx-2 12-2 may be managed by a BS 170), the network entity may send the information CBs to both Tx-1 and Tx-2, and the network entity enables Tx-2 12-2 to obtain the CBs or vertical check block(s). In another example, Tx-2 12-2 may be a cooperating ED that provides cooperation to help the Rx 14 to receive the information CBs. While Tx-1 12-1 sends information CBs to multiple Rx 14 in the transmission at 1202, Tx-1 12-1 may have also send the information CBs to Tx-2 12-2, either via the same transmission 1202 or through another link.

At 1202, Tx-1 12-1 transmits information CBs to the Rx 14 in an initial transmission. In some examples, the initial transmission may optionally include one or more vertical check blocks.

Optionally, at 1204, Tx-1 12-1 may receive feedback from the Rx 14. For example, in a feedback-based retransmission scheme, each Rx 14 may feedback ACK or NACK depending on whether that Rx 14 successfully decodes the initial transmission. In some examples, a RX 14 may only provide an optional ACK feedback if the Rx 14 successfully decodes the initial transmission and no feedback otherwise. In some examples (e.g., in a blind retransmission scheme), there may not be any ACK or NACK feedback at all. In the example shown in FIG. 12C, only Rx-1 14-1 successfully decodes all CBs and transmits back ACK at 1204. Rx-2 14-2 and Rx-3 14-3 each fails to decode different CBs and does not transmit any feedback at 1204.

If Tx-1 12-1 obtains feedback from the Rx 14, Tx-1 12-1 may determine that at least one Rx 14 failed to successfully decode the initial transmission. Tx-1 12-1 may indicate (e.g., over the communication link) to Tx-2 12-2 that a retransmission is needed. Tx-1 12-1 may further provide Tx-2 12-2 with the information CBs to generate one or more vertical check blocks, or may provide Tx-2 12-2 with the vertical check block(s) generated by the Tx-1 12-1. Tx-2 12-2 transmits the vertical check block(s) (indicated as VCB1 in FIG. 12C) at 1206. The transmission at 1206 may be to all Rx 14, or only to those Rx 14 that failed to successfully decode the initial transmission (e.g., indicated by NACK feedback, or absence of ACK feedback from those Rx 14). In the example of FIG. 12C, the transmission at 1206 is sent to all Rx 14.

In other examples, Tx-2 12-2 may generate and transmit the one or more vertical check blocks independently of Tx-1 12-1. For example, Tx-1 12-1 and Tx-2 12-2 may be configured to each perform a predetermined number of transmission/retransmissions. Further, the transmissions at 1202 and 1206 by Tx-1 12-1 and Tx-2 12-2 may occur simultaneously or overlap in time.

Although not shown in FIGS. 12A and 12C, Tx-1 12-1 may also perform one or more retransmissions. The respective vertical check block(s) transmitted by each of Tx-1 12-1 and Tx-2 12-2 may be generated using different interleavers.

Optionally, at 1210, Tx-1 12-1 may receive from the Rx 14 feedback indicating that the CBs have been successfully decoded. In the example of FIG. 12C, all Rx 14 feedback ACK to Tx-1 12-1. The retransmissions may end. In other examples, there may not be any feedback, and Tx-1 12-1 and/or Tx-2 12-2 may independently perform a predetermined number of retransmissions.

Figure 12B:
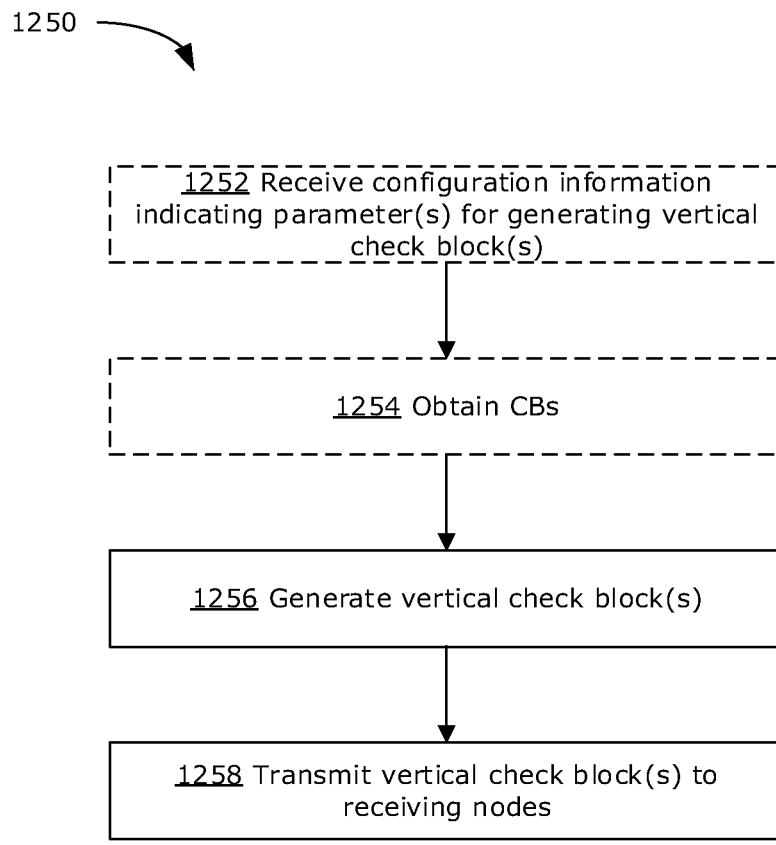
FIG. 12B is a flowchart illustrating an example method that may be performed by a transmitting node, in accordance with FIG. 12A.
Figure 12C:
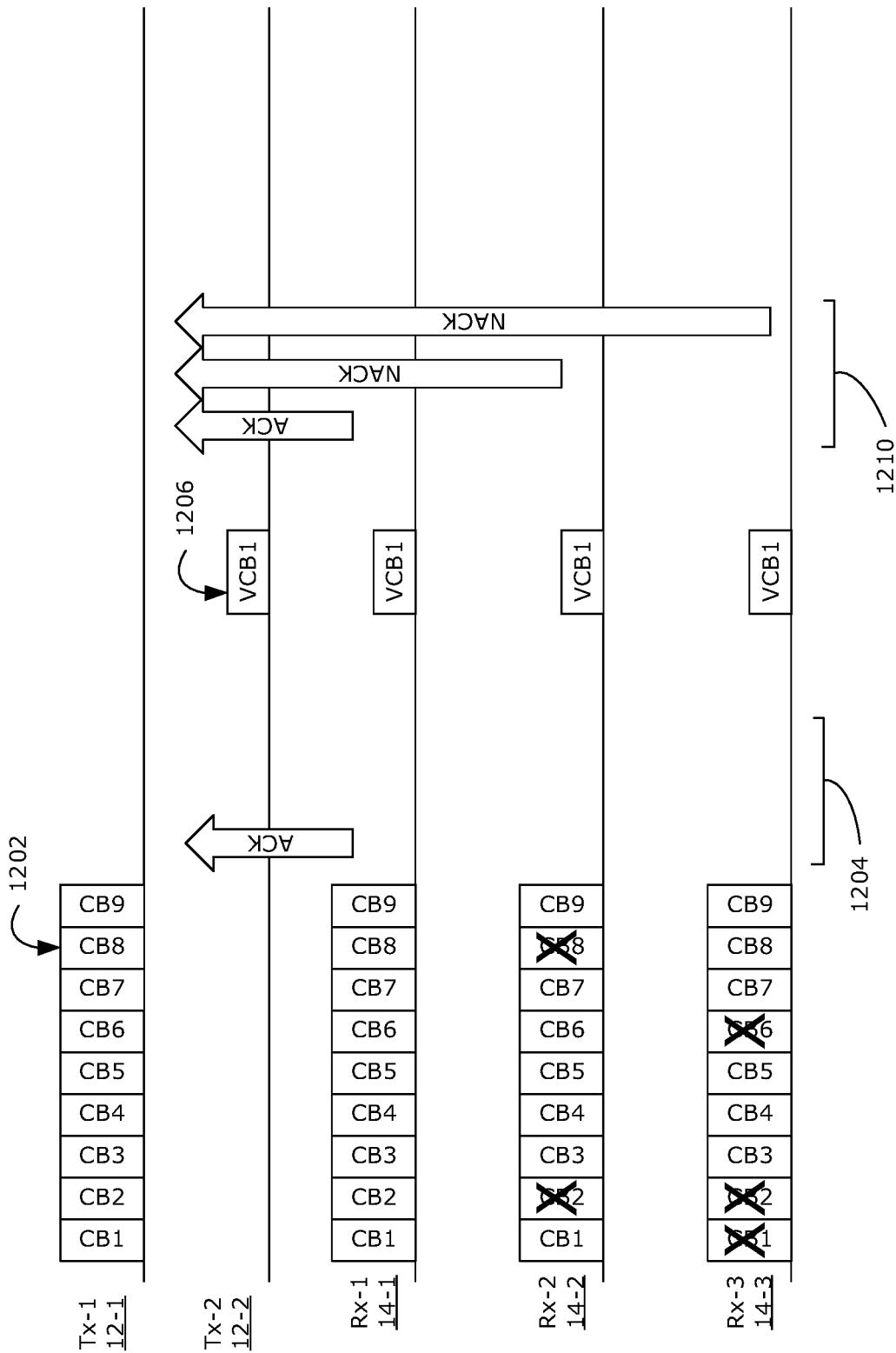
FIG. 12C illustrate an example of the code blocks transmitted in the example of FIG. 12A.

FIG. 12B is a flowchart illustrating an example method 1250 that may be performed by the second transmitting node Tx-2 12-2, in accordance with the signaling example of FIG. 12A.

Optionally, at 1252, Tx-2 12-2 may receive (e.g., from Tx-1 12-1 or other network entity managing Tx-2 12-2) configuration information indicating the parameter(s) to use for generating vertical check block(s). The configuration information may be received in a configuration signal or control signal (e.g., RRC signal, PC5-RRC signal, DCI transmission or SCI transmission), or over a direct communication link. The signal may be used to indicate NDI, HARQ process ID, number of repetitions, number of vertical check block(s) transmitted, and parameters for generating vertical check block(s) such as code block partitioning, selection of interleaver, RV or RV sequence, coding rate, index of CBs used to generate vertical check block(s), and/or other information related to generation of vertical check block(s) as discussed previously.

In some examples, Tx-2 12-2 may already be configured with the configuration information, or the configuration information may be predetermined (e.g., defined in a standard), and step 1252 may be omitted.

Optionally, at 1254, Tx-2 12-2 may obtain the CBs (which are sent in the initial transmission by Tx-1 12-1, for example at signal 1102 of FIG. 12A). As described previously, the CBs may be obtained by Tx-2 12-2 in various ways, such as over a communication link directly between Tx-1 12-1 and Tx-2 12-2 or from another network entity (e.g., from a DL, UL or SL transmission). In some examples, the configuration information and the CBs may be obtained at the same time, or together in the same communication.

In some examples, Tx-2 12-2 may receive the configuration information and the CBs from Tx-1 12-1 only after Tx-1 12-1 determines that at least one Rx 14 failed to successfully decode the initial transmission and that retransmission is required. In other examples, Tx-2 12-2 may generate the vertical check block(s) and perform the retransmission independently of Tx-1 12-1.

At 1256, one or more vertical check blocks is generated (e.g., using parameter(s) indicated at optional step 1252). The vertical check block(s) is generated from information bits selected from two or more of the CBs sent in the initial transmission by Tx-1 12-1). In some examples, Tx-2 12-2 may be provided with the vertical check block(s) (e.g., from a DL, UL or SL transmission) and step 1256 may be omitted.

At 1258, the vertical check block(s) is transmitted to at least one Rx 14. In some examples, the vertical check block(s) may be transmitted in a broadcast, multicast or groupcast to all Rx 14 regardless of whether a given Rx 14 successfully or unsuccessfully decoded the initial transmission (e.g., in a blind retransmission scheme).

The present disclosure describes some examples with reference to flowcharts. It should be understood that the steps that are described may be performed in a different order than that shown, and may be adapted to any of the examples disclosed herein.

The present disclosure makes reference to vertical check blocks. It should be understood that vertical check blocks may also be referred to as cross-packet check blocks, cross-TB check blocks, or cross-code block check blocks, among other possibilities and depending on implementation. Further, check blocks may be equally referred to as parity blocks, or redundancy blocks, among other possibilities. The use of vertical check blocks may also be referred to as product code based network coding.

The present disclosure may be applicable to systematic code (e.g., LPDC code, or Turbo code) as well as non-systematic code (e.g., Polar code, linear block code, or convolutional code). That is, vertical check blocks, as discussed herein, may be generated from CBs encoded using systematic or non-systematic code.

The present disclosure describes the use of vertical check blocks for HARQ retransmission in broadcast, multicast and groupcast scenarios. The examples may be suitable for feed-back based retransmission schemes, as well as ACK/NACKless or rateless retransmission schemes.

One or more vertical check blocks may be generated for each retransmission. The vertical check block(s) may be generated using bits selected from all CBs. In some cases, the vertical check block(s) may be generated using bits selected from CBs belonging to different packets.

The disclosed examples may be implemented in V2X applications, or IoT applications, among others. Although discussion of some examples is provided in the context of V2X, it should be understood that the examples described herein may be applicable to other applications.

In an example 1 of the present disclosure, there is provided a method including: transmitting two or more information code blocks (CBs) to a plurality of intended receiving nodes; generating one or more cross-CB check blocks, each cross-CB check block being generated based on a set of cross-CB bits, the set of cross-CB bits including at least one bit selected from each of at least two of the information CBs; and transmitting at least one of the one or more cross-CB check blocks to at least one of the intended receiving nodes.

In an example 2 of the present disclosure, there is provided the method of example 1, wherein the two or more information CBs are transmitted in a broadcast, multicast or groupcast transmission to the plurality of intended receiving nodes, and wherein the at least one cross-CB check block is transmitted in a broadcast, multicast or groupcast transmission to two or more of the intended receiving nodes.

In an example 3 of the present disclosure, there is provided the method of example 1 or example 2, further comprising: receiving feedback from the intended receiving nodes indicating whether a respective intended receiving node successfully decoded the two or more information CBs; and transmitting the at least one cross-CB check block after determining, from the feedback, that at least one of the intended receiving nodes failed to successfully decode the two or more information CBs.

In an example 4 of the present disclosure, there is provided the method of example 3, wherein a negative acknowledgement (NACK) feedback is received to indicate the respective intended receiving node failed to successfully decode the two or more information CBs.

In an example 5 of the present disclosure, there is provided the method of example 3, wherein absence of an acknowledgement (ACK) feedback from the respective intended receiving node indicates that the respective intended receiving node failed to successfully decode the two or more information CBs.

In an example 6 of the present disclosure, there is provided the method of example 3, wherein the at least one cross-CB check block is transmitted only to the at least one of the intended receiving nodes that failed to successfully decode the two or more information CBs.

In an example 7 of the present disclosure, there is provided the method of example 1 or example 2, wherein the at least one cross-CB check block is transmitted to all of the plurality of intended receiving nodes.

In an example 8 of the present disclosure, there is provided the method of example 7, wherein the at least one cross-CB check block is transmitted in absence of any feedback from any of the intended receiving nodes.

In an example 9 of the present disclosure, there is provided the method of example 8, wherein respective sets of one or more cross-CB check blocks are transmitted in respective retransmissions, for a predetermined number of retransmissions, without receiving any feedback from any of the intended receiving nodes for the initial transmission.

In an example 10 of the present disclosure, there is provided the method of example 1 or example 2, wherein the two or more information CBs are transmitted in at least two separately transmitted packets to the plurality of intended receiving nodes, and wherein the one or more cross-CB check blocks are generated based on bits selected from CBs of each of the at least two packets.

In an example 11 of the present disclosure, there is provided the method of example 10, further including: receiving feedback indicating whether at least one intended receiving node failed to successfully decode at least one of the packets; and generating the one or more cross-CB check blocks based on bits selected only from the at least one packet that failed to be successfully decoded.

In an example 12 of the present disclosure, there is provided the method of example 11, wherein the at least one of the one or more cross-CB check blocks is transmitted only to the at least one intended receiving node that failed to successfully decode the at least one of the packets.

In an example 13 of the present disclosure, there is provided the method of example 10, wherein at least one of the one or more cross-CB check block is transmitted in absence of any feedback from any of the intended receiving nodes.

In an example 14 of the present disclosure, there is provided the method of example 1 or example 2, wherein the at least one cross-CB check block is transmitted with the two or more information CBs in a single transmission.

In an example 15 of the present disclosure, there is provided the method of example 14, further including: determining, from channel feedback received from the intended receiving nodes, a number of cross-CB check blocks to transmit with the two or more information CBs in the single transmission.

In an example 16 of the present disclosure, there is provided the method of any one of example 1 to 14, further including: transmitting a configuration or control signal to the intended receiving nodes, the configuration signal including information about one or more parameters used in generating the one or more cross-CB check blocks.

In an example 17 of the present disclosure, there is provided the method of example 16, wherein the configuration or control signal includes information about one or more of: an indication of new transmission or retransmission; a HARQ process identifier; a number of repetitions for retransmission; a number of cross-CB check blocks transmitted; an index of the two or more information CBs used for generating the one or more cross-CB check blocks; an interleaver used for generating the one or more cross-CB check blocks; or a redundancy version (RV) or RV sequence indicating how the one or more cross-CB check blocks are generated.

In an example 18 of the present disclosure, there is provided the method of any one of example 1 to 17, further including: receiving a configuration or control signal, the configuration or control signal including information about one or more parameters to be used in generating the one or more cross-CB check blocks.

In an example 19 of the present disclosure, there is provided the method of any one of example 1 to 18, wherein the set of cross-CB bits for generating the one or more cross-CB check blocks is selected according to a predefined interleaver.

In an example 20 of the present disclosure, there is provided the method of example 19, further including: generating an additional one or more cross-CB check blocks based on another set of cross-CB bits, the other set of cross-CB bits being selected according to another predefined interleaver.

In an example 21 of the present disclosure, there is provided the method of any one of example 1 to 20, further including: receiving, from a base station, a scheduled resource allocation for transmitting the two or more information CBs; receiving feedback indicating whether at least one intended receiving node failed to successfully decode at least one of the two or more information CBs; transmitting, to the base station, a report of negative acknowledgement (NACK); and receiving, from the base station, additional scheduled resource allocation for transmitting the at least one cross-CB check block.

In an example 22 of the present disclosure, there is provided the method of any one of example 1 to 20, further including: receiving, from a base station, a scheduled resource allocation for transmitting the two or more information CBs and for a predetermined number of transmissions of cross-CB check blocks.

In an example 23 of the present disclosure, there is provided the method of any one of example 1 to 20, further including: selecting, from a resource pool, resources for transmitting the two or more information CBs.

In an example 24 of the present disclosure, there is provided the method of any one of example 1 to 20, further including: selecting, from a resource pool, resources for transmitting the two or more information CBs and for a predetermined number of transmissions of cross-CB check blocks.

In an example 25 of the present disclosure, there is provided a method including: receiving information for generating one or more cross-code block (CB) check blocks, each cross-CB check block being generated based on a set of cross-CB bits, the set of cross-CB bits including at least one bit selected from each of at least two information CBs; and transmitting at least one of the one or more cross-CB check blocks to a plurality of intended receiving nodes.

In an example 26 of the present disclosure, there is provided the method of example 25, wherein the at least one cross-CB check block is transmitted in a broadcast, multicast or groupcast transmission to the intended receiving nodes.

In an example 27 of the present disclosure, there is provided the method of example 25 or example 26, wherein the received information includes the at least two information CBs.

In an example 28 of the present disclosure, there is provided the method of any one of example 25 to 27, wherein the received information includes information about one or more parameters to be used in generating the one or more cross-CB check blocks.

In an example 29 of the present disclosure, there is provided the method of example 28, wherein the received information includes information about one or more of: an indication of new transmission or retransmission; a HARQ process identifier; a number of repetitions for retransmission; a number of cross-CB check blocks transmitted; an index of the two or more information CBs used for generating the one or more cross-CB check blocks; an interleaver used for generating the one or more cross-CB check blocks; or a redundancy version (RV) or RV sequence indicating how the one or more cross-CB check blocks are generated.

In an example 30 of the present disclosure, there is provided the method of any one of example 1 to 29, wherein the method is performed at a network-enabled vehicle.

In an example 31 of the present disclosure, there is provided the method of any one of example 1 to 29, wherein the method is performed at a user equipment device.

In an example 32 of the present disclosure, there is provided the method of any one of example 1 to 20 or 25 to 29, wherein the method is performed at a base station.

In an example 33 of the present disclosure, there is provided the method of any one of example 1 to 32, wherein the CBs are encoded using systematic code.

In an example 34 of the present disclosure, there is provided the method of example 33, wherein the CBs are encoded using low density parity check (LDPC) code or Turbo code.

In an example 35 of the present disclosure, there is provided the method of any one of example 1 to 32, wherein the CBs are encoded using non-systematic code.

In an example 36 of the present disclosure, there is provided the method of example 35, wherein the CBs are encoded using polar code, linear block code, or convolutional code.

In an example 37 of the present disclosure, there is provided an apparatus including a processing unit, the processing unit being configured to execute machine-readable instructions to cause the apparatus to perform the method of any one of example 1 to 36.

In an example 38 of the present disclosure, there is provided a computer readable medium having machine-executable instructions stored thereon, wherein the instructions, when executed by a processing unit of an apparatus, cause the apparatus to perform the method of any one of example 1 to 36.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, comprising:
transmitting two or more information code blocks (CBs) in a broadcast, multicast or groupcast transmission to a plurality of intended receiving nodes, wherein each of the two or more information CBs includes a respective set of information bits and a respective CB-specific check block encoded from the respective set of information bits;
generating one or more cross-CB check blocks, each cross-CB check block generated by combining at least two subsets of one or more bits each, each of the at least two subsets being a respective subset of bits of a respective one of at least two of the information CBs; and
transmitting at least one of the one or more cross-CB check blocks in another broadcast, multicast or groupcast transmission to two or more of the intended receiving nodes.

2. The method of claim 1,
wherein feedback from the intended receiving nodes indicates whether a respective intended receiving node successfully decoded the two or more information CBs;
the method further comprising:
transmitting the at least one cross-CB check block after determining, from received negative acknowledgement (NACK) feedback or absence of acknowledgement (ACK) feedback, that at least one of the intended receiving nodes failed to successfully decode the two or more information CBs.

3. The method of claim 1, wherein respective sets of one or more cross-CB check blocks are transmitted in respective retransmissions, for a predetermined number of retransmissions, in absence of any feedback from any of the intended receiving nodes for an initial transmission.

4. The method of claim 1, further comprising:
receiving an acknowledgement (ACK) feedback from at least one intended receiving node, after an initial transmission or after a given retransmission;
wherein any retransmissions after the initial transmission or the given retransmission are not transmitted to the at least one intended receiving node from which the ACK feedback was received.

5. The method of claim 1, wherein transmission of at least one of the one or more cross-CB check blocks to the plurality of intended receiving nodes is performed, in absence of negative acknowledgement (NACK) feedback, until an acknowledgement (ACK) feedback is received from each of the plurality of intended receiving nodes.

6. The method of claim 1, wherein the two or more information CBs are transmitted in at least two separately transmitted packets to the plurality of intended receiving nodes, and wherein the one or more cross-CB check blocks are generated by combining respective subsets of one or more bits selected from CBs of each of the at least two packets.

7. The method of claim 1, further comprising:
transmitting a control signal to the intended receiving nodes, the control signal indicating information about one or more parameters used in generating the one or more cross-CB check blocks;
wherein the control signal indicates information about one or more of:
an indication of new transmission or retransmission;
a HARQ process identifier;
a number of repetitions for retransmission;
a number of cross-CB check blocks transmitted;
an index of the two or more information CBs used for generating the one or more cross-CB check blocks;
an interleaver used for generating the one or more cross-CB check blocks; or
a redundancy version (RV) or RV sequence indicating how the one or more cross-CB check blocks are generated.

8. The method of claim 1, further comprising:
receiving, from a base station, a resource allocation for transmitting the two or more information CBs;
wherein resources for transmission of the at least one cross-CB check block are also allocated by the base station.

9. The method of claim 8, further comprising:
receiving feedback indicating whether at least one intended receiving node failed to successfully decode at least one of the two or more information CBs;
transmitting, to the base station, a report of negative acknowledgement (NACK); and
receiving, from the base station, an additional resource allocation for transmitting the at least one cross-CB check block.

10. The method of claim 8, wherein resources for a predetermined number of transmissions of cross-CB check blocks are also allocated in the resource allocation from the base station.

11. The method of claim 1, further comprising:
selecting, from a resource pool, resources for transmitting the two or more information CBs;

wherein resources for transmission of the at least one cross-CB check block are also selected from the resource pool.

12. The method of claim 1, wherein a number of cross-CB check blocks transmitted in the another broadcast, multicast or groupcast transmission is fewer than a number of unsuccessfully decoded information CBs at any of the intended receiving nodes.

13. The method of claim 1, wherein a single cross-CB check block is sufficient to assist in decoding of two or more unsuccessfully decoded information CBs.

14. An apparatus comprising a processing unit, the processing unit being configured to execute machine-readable instructions to cause the apparatus to:
    transmit two or more information code blocks (CBs) in a broadcast, multicast or groupcast transmission to a plurality of intended receiving nodes, wherein each of the two or more information CBs includes a respective set of information bits and a respective CB-specific check block encoded from the respective set of information bits;
    generate one or more cross-CB check blocks, each cross-CB check block being generated by combining at least two subsets of one or more bits each, each of the at least two subsets being a respective subset of bits of a respective one of at least two of the information CBs; and
    transmit at least one of the one or more cross-CB check blocks in another broadcast, multicast or groupcast transmission to two or more of the intended receiving nodes.

15. The apparatus of claim 14,
    wherein feedback from the intended receiving nodes indicates whether a respective intended receiving node successfully decoded the two or more information CBs;
    wherein the processing unit is further configured to execute the instructions to cause the apparatus to:
    transmit the at least one cross-CB check block after determining, from received negative acknowledgement (NACK) feedback or absence of acknowledgement (ACK) feedback, that at least one of the intended receiving nodes failed to successfully decode the two or more information CBs.

16. The apparatus of claim 14, wherein respective sets of one or more cross-CB check blocks are transmitted in respective retransmissions, for a predetermined number of retransmissions, in absence of any feedback from any of the intended receiving nodes for an initial transmission.

17. The apparatus of claim 14, wherein the processing unit is further configured to execute the instructions to cause the apparatus to:
    transmit a control signal to the intended receiving nodes, the control signal indicating information about one or more parameters used in generating the one or more cross-CB check blocks;
    wherein the control signal indicates information about one or more of:
        an indication of new transmission or retransmission;
        a HARQ process identifier;
        a number of repetitions for retransmission;
        a number of cross-CB check blocks transmitted;
        an index of the two or more information CBs used for generating the one or more cross-CB check blocks;
        an interleaver used for generating the one or more cross-CB check blocks; or
        a redundancy version (RV) or RV sequence indicating how the one or more cross-CB check blocks are generated.

18. The apparatus of claim 14, wherein the processing unit is further configured to execute the instructions to cause the apparatus to:
    receive, from a base station, a resource allocation for transmitting the two or more information CBs;
    wherein resources for transmission of the at least one cross-CB check block are also allocated by the base station.

19. The apparatus of claim 14, wherein the processing unit is further configured to execute the instructions to cause the apparatus to:
    select, from a resource pool, resources for transmitting the two or more information CBs;
    wherein resources for transmission of the at least one cross-CB check block are also selected from the resource pool.

20. A non-transitory computer readable medium having machine-executable instructions stored thereon, wherein the instructions, when executed by a processing unit of an apparatus, cause the apparatus to:
    transmit two or more information code blocks (CBs) in a broadcast, multicast or groupcast transmission to a plurality of intended receiving nodes, wherein each of the two or more information CBs includes a respective set of information bits and a respective CB-specific check block encoded from the respective set of information bits;
    generate one or more cross-CB check blocks, each cross-CB check block being generated by combining at least two subsets of one or more bits each, each of the at least two subsets being a respective subset of bits of a respective one of at least two of the information CBs; and
    transmit at least one of the one or more cross-CB check blocks in another broadcast, multicast or groupcast transmission to two or more of the intended receiving nodes.

* * * * *